(12) United States Patent
Koike et al.

(10) Patent No.: US 8,319,831 B2
(45) Date of Patent: Nov. 27, 2012

(54) COMPONENT MANIPULATING METHOD, COMPONENT EXTRACTING METHOD, COMPONENT ASSEMBLING METHOD, COMPONENT MANIPULATING APPARATUS, COMPONENT EXTRACTING APPARATUS, AND COMPONENT ASSEMBLING APPARATUS

(75) Inventors: Naoki Koike, Ebina (JP); Taketoshi Furuki, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 684 days.

(21) Appl. No.: 12/542,378

(22) Filed: Aug. 17, 2009

(65) Prior Publication Data

US 2010/0245558 A1    Sep. 30, 2010

(30) Foreign Application Priority Data

Mar. 25, 2009  (JP) ................................. 2009-074343
Mar. 25, 2009  (JP) ................................. 2009-074360

(51) Int. Cl.
*G06F 19/00* (2011.01)
*G06K 9/40* (2006.01)
*H04N 7/18* (2006.01)

(52) U.S. Cl. ........................... 348/86; 700/245; 382/274
(58) Field of Classification Search .................. 700/245; 382/274; 348/86
See application file for complete search history.

(56) References Cited

U.S. PATENT DOCUMENTS

| | | | | |
|---|---|---|---|---|
| 5,640,241 A * | 6/1997 | Ogawa | ........................... | 356/615 |
| 6,985,236 B2 * | 1/2006 | Seko et al. | ..................... | 356/498 |
| 7,203,573 B2 * | 4/2007 | Ban et al. | ....................... | 700/258 |
| 2002/0030736 A1 * | 3/2002 | Hudson et al. | ................... | 348/86 |
| 2003/0078694 A1 * | 4/2003 | Watanabe et al. | ............. | 700/245 |
| 2004/0051880 A1 * | 3/2004 | Seko et al. | ...................... | 356/614 |
| 2005/0102060 A1 * | 5/2005 | Watanabe et al. | ............. | 700/245 |
| 2009/0070065 A1 * | 3/2009 | Seko et al. | ..................... | 702/152 |
| 2009/0257860 A1 * | 10/2009 | Schafer | ....................... | 414/795.4 |
| 2010/0246894 A1 * | 9/2010 | Koike et al. | .................... | 382/106 |
| 2010/0246895 A1 * | 9/2010 | Koike et al. | .................... | 382/106 |

FOREIGN PATENT DOCUMENTS

| | | |
|---|---|---|
| JP | 05-301183 | 11/1993 |
| JP | 11-156764 | 6/1999 |
| JP | 2005-055244 | 3/2005 |
| JP | 2005-138223 | 6/2005 |

* cited by examiner

*Primary Examiner* — Larry Donaghue
(74) *Attorney, Agent, or Firm* — Sughrue Mion, PLLC

(57) ABSTRACT

A component manipulating method includes recognizing, computing, and manipulating. The recognizing is a process in which a position and an attitude of a measured object is recognized by taking an image of a light spot group of the measured object with a camera, the measured object having the light spot group including a plurality of light spots, based on a light image expressing light spots constituting the light spot group on an image taken with the camera. The computing is a process in which a position and an attitude of the component are computed based on the position and the attitude of the recognized measured object and also on geometric arrangement positions of the measured object and the component. The manipulating is a process in which a robot being used to perform operations on the component is manipulated based on the computed position and the attitude.

28 Claims, 41 Drawing Sheets

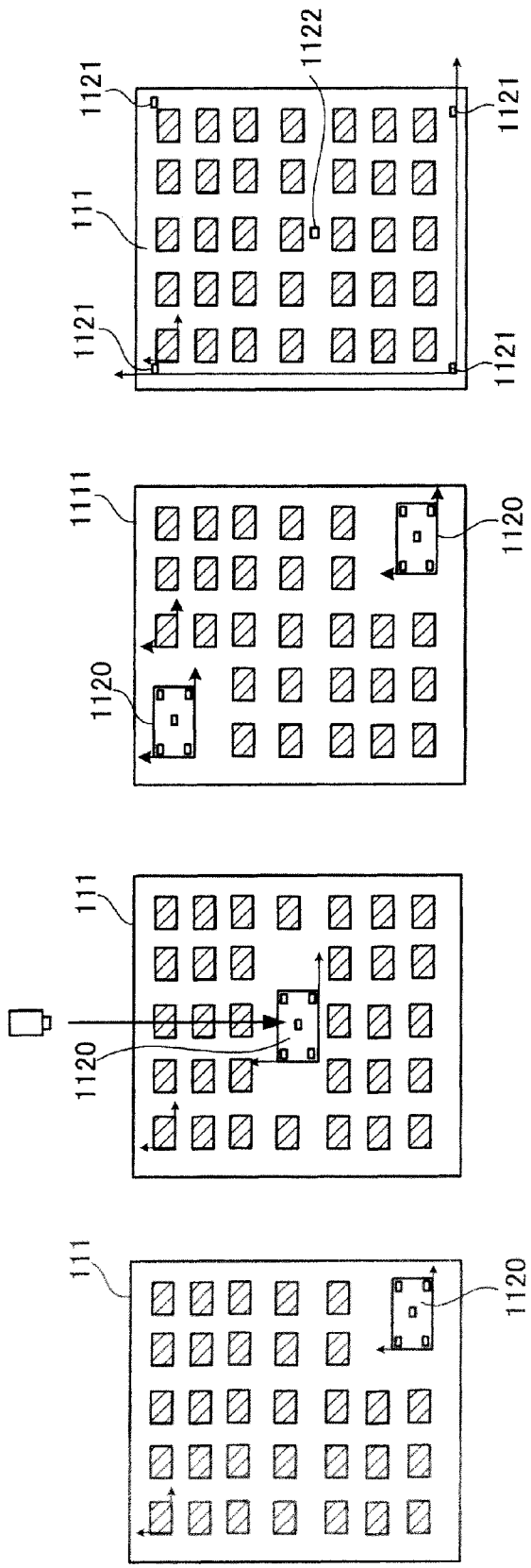

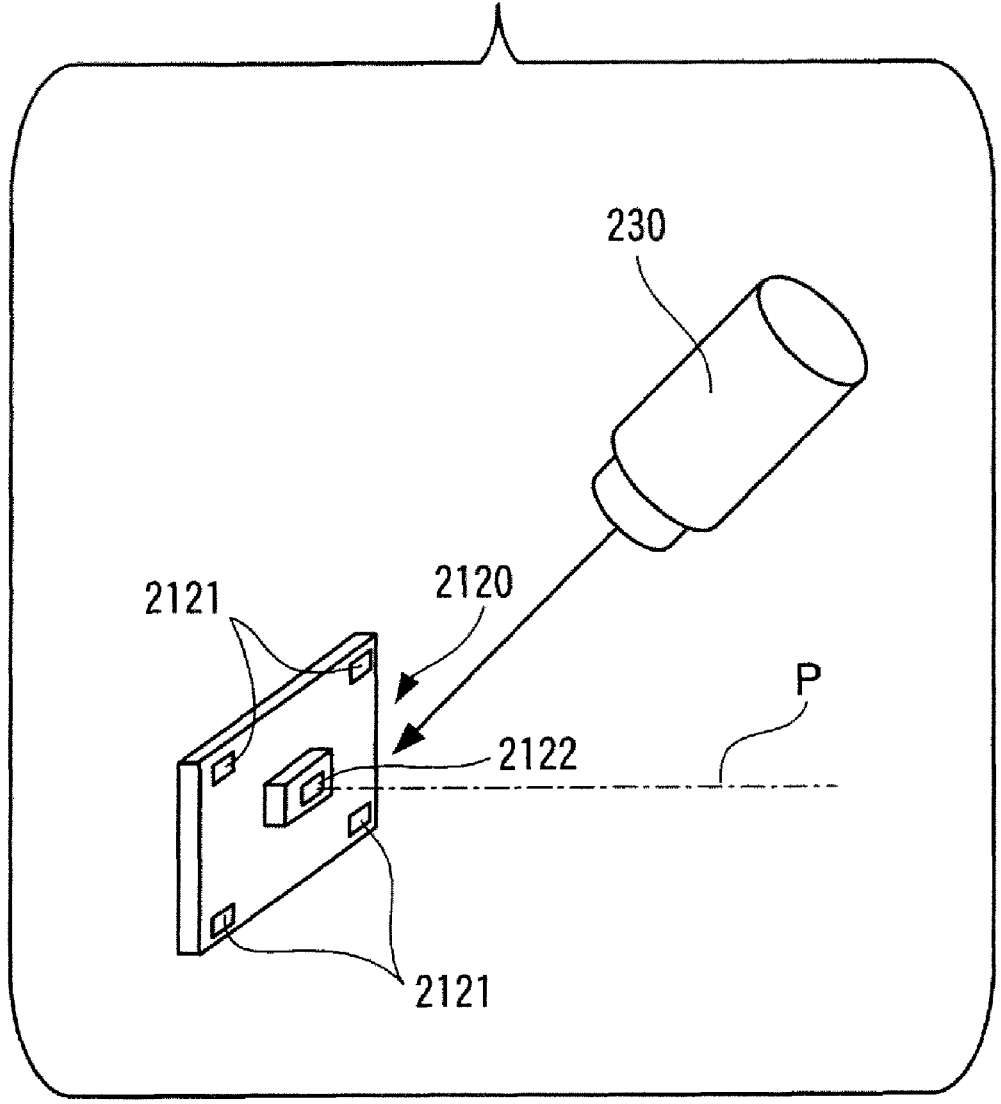

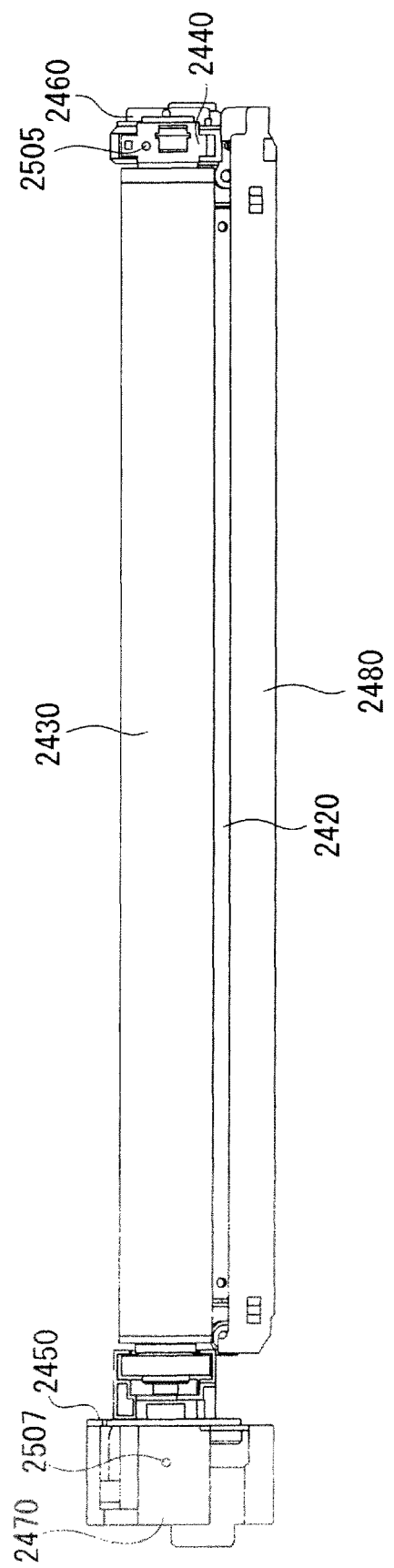

COMPONENT MANIPULATING METHOD, COMPONENT EXTRACTING METHOD, COMPONENT ASSEMBLING METHOD, COMPONENT MANIPULATING APPARATUS, COMPONENT EXTRACTING APPARATUS, AND COMPONENT ASSEMBLING APPARATUS

CROSS-REFERENCE TO RELATED APPLICATIONS

This application is based on and claims priority under 35 USC 119 from Japanese Patent Applications No. 2009-074360 and No. 2009-074343 filed on Mar. 25, 2009.

BACKGROUND

Technical Field

The present invention relates to a component manipulating method, a component extracting method, a component assembling method, a component manipulating apparatus, a component extracting apparatus, and a component assembling apparatus.

SUMMARY

According to an aspect of the invention, there is provided a component manipulating method including:

recognizing a position and an attitude of a measured object by taking an image of a light spot group of the measured object with a camera, the measured object and a component of a manipulating target being supported in predetermined positions of a component support, the measured object having the light spot group including plural light spots, serving as a measurement target of a position and an attitude, based on a light image expressing light spots constituting the light spot group on an image taken with the camera;

computing a position and an attitude of the component based on the position and the attitude of the measured object recognized in the recognizing as well as geometric arrangement positions of the measured object supported by the component support and the component; and manipulating a robot to perform operations on the component based on the position and the attitude computed in the computing, the robot being used to perform operations on the component.

BRIEF DESCRIPTION OF THE DRAWINGS

Exemplary embodiments of the present invention will be described in detail based on the following figures, wherein:

FIGS. 12A, 12B, 12C, and 12D illustrate positions in which the LED board or LEDs are fixed to the alignment tray;

FIG. 14 is an explanatory view illustrating a measuring method;

FIG. 41 illustrates a state in which a charging device has been further assembled.

DETAILED DESCRIPTION

A conventional component extracting method will be described as a comparative example, and then various exemplary embodiments of the invention will be described.

Figure 1A:
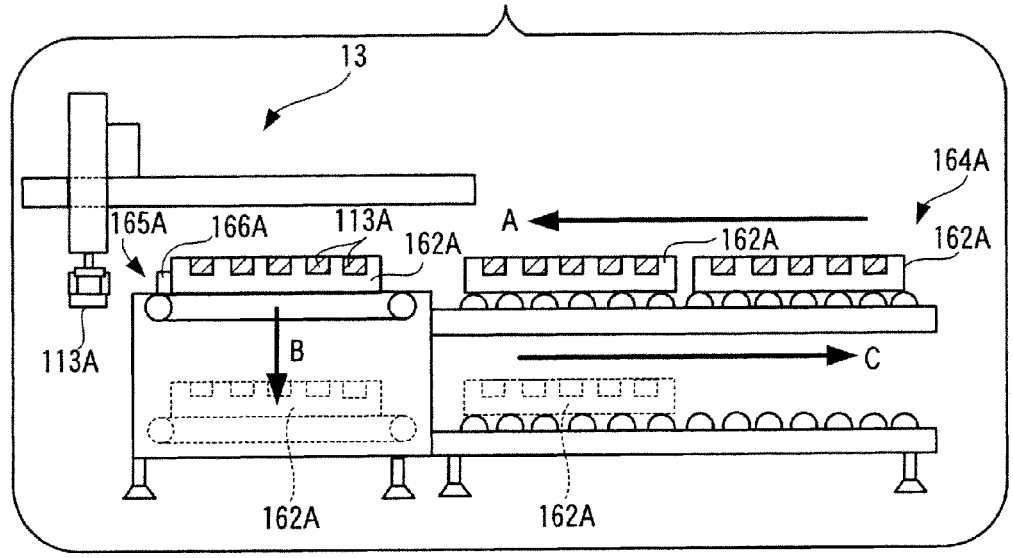
FIG. 1 is an explanatory view of a conventional component extracting method.
Figure 1B:
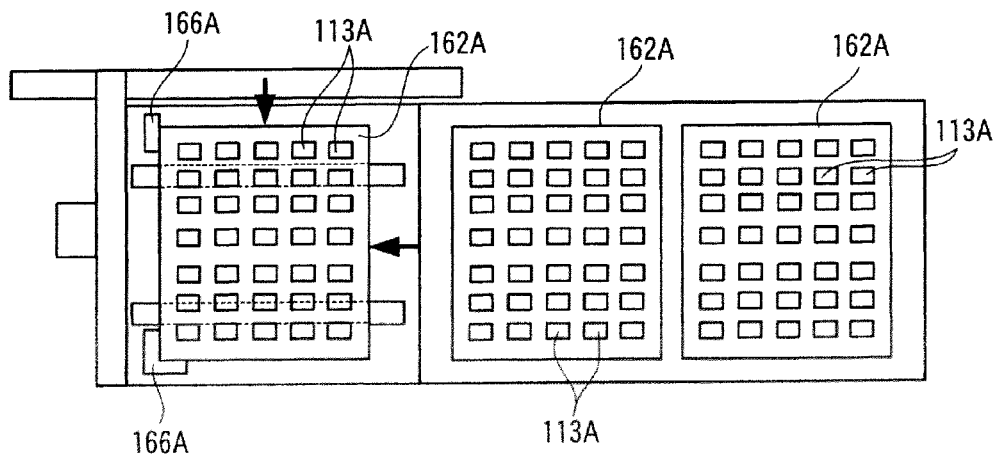

FIGS. 1A and 1B are an explanatory view of a conventional component extracting method.

FIG. 1A is a side view illustrating a conveying mechanism that conveys an alignment tray 162A on which components 113A are put, and FIG. 1B is a plan view of the conveying mechanism. The alignment tray corresponds to an example of the component support of the invention.

The alignment tray 162A on which components 113A are put is placed on a conveying stage 164A is conveyed in a direction of an arrow A, the alignment tray 162A located at a leading end in the A-direction is placed on a lifting and lowering mechanism 165A, and the alignment tray 162A is stopped by abutting on an abutment 166A. After the alignment tray 162A is stopped, a robot 13 manipulates the component 113A. More particularly, the robot 13 extracts the component 113A from the alignment tray 162A.

At this point, when the alignment tray 162A is stopped by abutting on the abutment 166A, sometimes the alignment tray 162A is inclined by an abutment impact of the alignment tray 162A on the abutment 166A.

Figure 2:
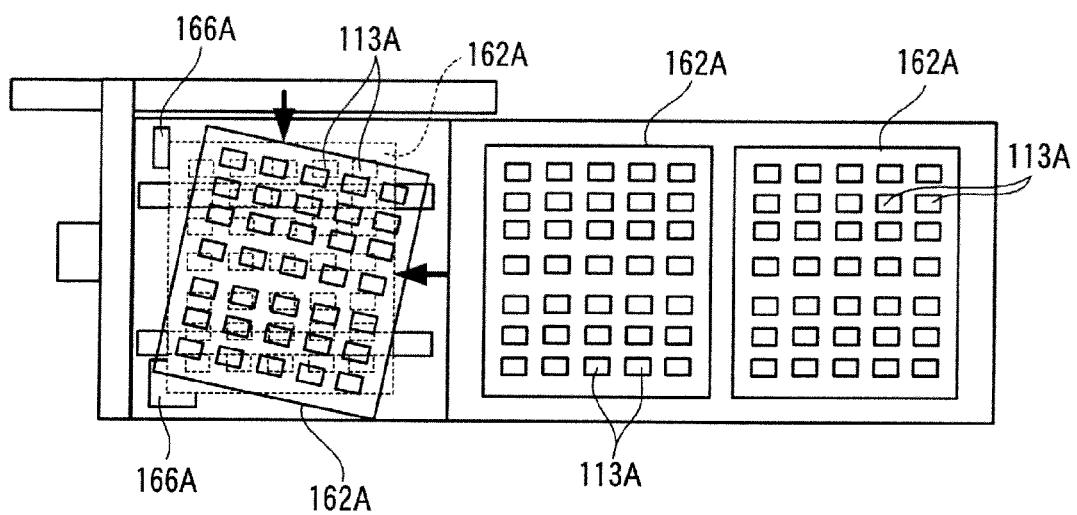
FIG. 2 illustrates an alignment tray that is stopped while placed on a lifting and lowering mechanism.

FIG. 2 illustrates the alignment tray 162A that is stopped while placed on the lifting and lowering mechanism 165A.

Broken lines of FIG. 2 indicate a regular position and a regular attitude of the alignment tray 162A.

Frequently the alignment tray 162A is placed on the conveying stage 164A in a cursory attitude, and sometimes the alignment tray 162A is inclined when abutting on the abutment 166A of the lifting and lowering mechanism 165A. In this way, sometimes the alignment tray 162A is stopped with a displacement or an inclination as illustrated in FIG. 2.

The robot 13 is programmed to grasp and extract the component 113A from the alignment tray 162A on the assumption that the alignment tray 162A abuts on the abutment 166A to be stopped in the correct attitude at the regular position. Accordingly, when the alignment tray 162A is stopped with the displacement or inclination, the robot 13 cannot grasp the component 113A and extract the component 113A from the alignment tray 162A.

As described above, in the conventional component extracting method, there is a problem that the robot 13 may not be able to grasp and extract the component 113A from the alignment tray 162A when the alignment tray 162A is inclined.

Various exemplary embodiments of the invention will be described based on the comparative example.

Figure 3:
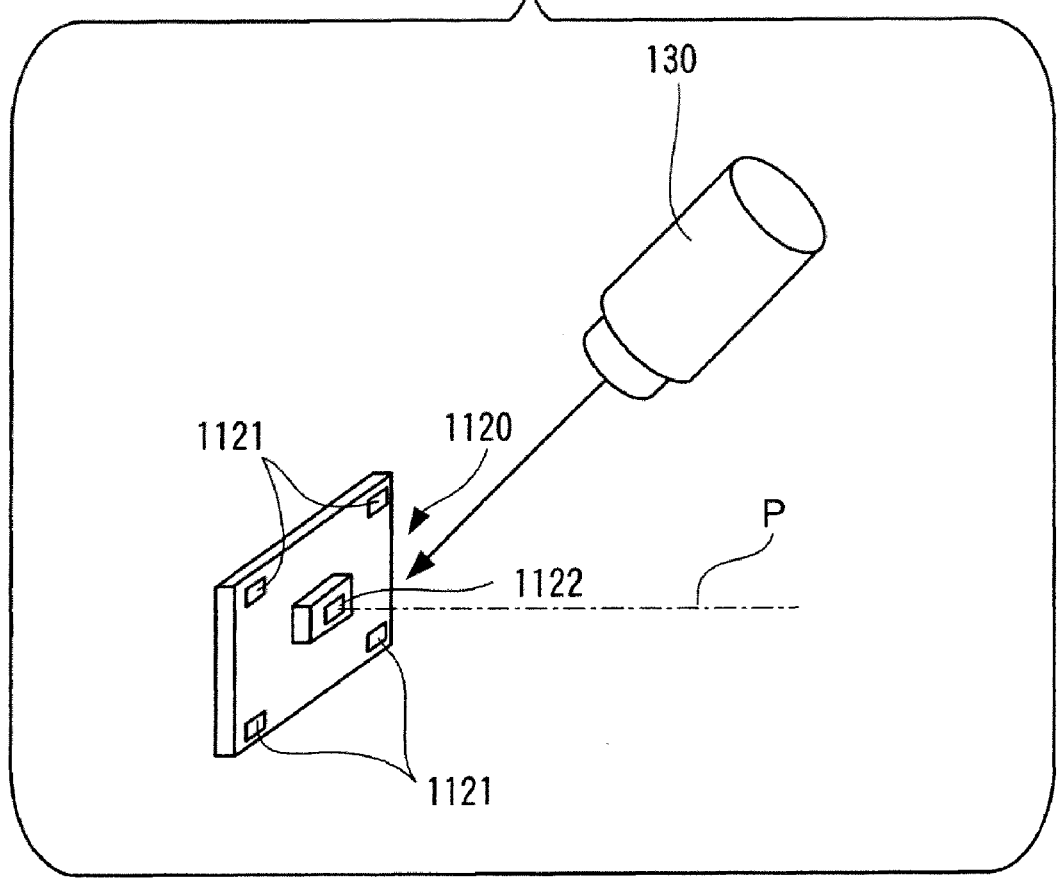
FIG. 3 is an explanatory view illustrating a measuring method employed in the following exemplary embodiments.

FIG. 3 is an explanatory view illustrating a measuring method employed in the following exemplary embodiments.

An LED board 1120 and a camera 130 are illustrated in FIG. 3. Plural LEDs 1121 and 1122 are disposed on the LED board 1120.

In the following exemplary embodiments, measuring accuracy is enhanced by employing the measuring method in which LEDs 1121 disposed on a surface of the LED board 1120 and another LED 1122 located slightly above the surface of the LED board 1120 are used.

The measuring method based on the image taken with the camera 130 is basically as follows. The position and attitude of the camera 130 are previously known, LEDs 1121 on the LED board 1120 are taken with the camera 130, and the directions of LEDs 1121 are obtained when the positions of the images of LEDs 1121 are viewed from the camera 130. The directions of LEDs 1121 viewed from the camera 130 are obtained because a relative positional relationship among LEDs 1121 is previously known. Therefore, the plane defined by LEDs 1121, that is, the position and attitude of the LED board 1120 are obtained from the pieces of information. Alternatively, dimensions of the images of LEDs 1121 may be used using the camera 130 on which an imaging lens having a large spherical aberration is mounted. When the imaging lens having the large spherical aberration is used, the images of LEDs 1121 become indistinct images having substantially elliptical shapes, and the dimensions of the image depend on a distance from the camera 130 to each LED 1121. With this phenomenon, the distance from the camera 130 to each LED 1121 is obtained based on dimensions of the image of LED 1121. Similarly the directions of LEDs 1121 viewed from the camera 130 are obtained from the position of the image taken with the camera 130.

The two conventional measuring methods may be used at the same time.

When the directions and distances of three LEDs 1121 on the LED board 1120 are obtained, the three-dimensional positions of LEDs 1121 are obtained, and the plane defined by three LEDs 1121 is obtained, that is, the position and attitude of the LED board 1120 on which three LEDs 1121 are disposed are obtained.

In FIG. 3, four LEDs 1121 are provided on the surface of the LED board 1120. The fourth LED 1121 is used to improve the accuracy when the position and attitude of the LED board 1120 is measured. Alternatively, the position of the fourth LED 1121 is changed for each LED board 1120, and the fourth LED 1121 may be used as ID in order to specify the ID board.

When the LED board 1120 is fixed to the predetermined position of the alignment tray 162A of FIGS. 1A and 1B, the position and attitude of the LED board 1121 are obtained, and the position and attitude of the component 113A on the alignment tray 162A are also obtained. When the position and attitude of the component 113A supported by the alignment tray 162A are obtained, the robot 13 can correctly grasp the component 113A whose position and attitude are obtained.

In the above-described measuring methods, although the directions of LEDs 1121 viewed from the camera 130 are measured with significantly high accuracy, the accuracy of distance between the camera 130 and each LED 1121 is lower than the accuracy of direction.

Therefore, another LED 1122 may be added to improve resolution of the distance, as described below.

As described above, the additional LED 1122 is disposed while perpendicularly spaced apart from the reference plane (at this point, the reference plane is overlapped with the surface of the LED board 1120).

In FIG. 3, the camera 130 is disposed in a posture, in which the camera 130 is orientated toward the reference plane from a position where an imaging optical axis is not matched with a perpendicular P passing through LED 1122 to the surface (the triangular reference plane formed by three LEDs 1121) of the LED board 1120. When the images of LEDs 1121 and 1122 are taken with the camera 130 while the camera 130 is disposed at the position where the imaging optical axis is not matched with the perpendicular P, a difference in relative position on the imaging screen between LEDs 1121 on the surface of the LED board 1120 and one LED 1122 located slightly above the surface of the LED board 1120 is varied according to the imaging direction.

The measuring method in which the difference in relative position on the imaging screen between LEDs 1121 and LED 1122 is utilized may be employed in addition to any one of or both of the above-described conventional measuring methods. Thereby, the position and attitude of the reference plane, that is, the position and attitude of the LED board 1120 in FIG. 3 can be measured with accuracy higher than that of the conventional measuring method.

Figure 4A:
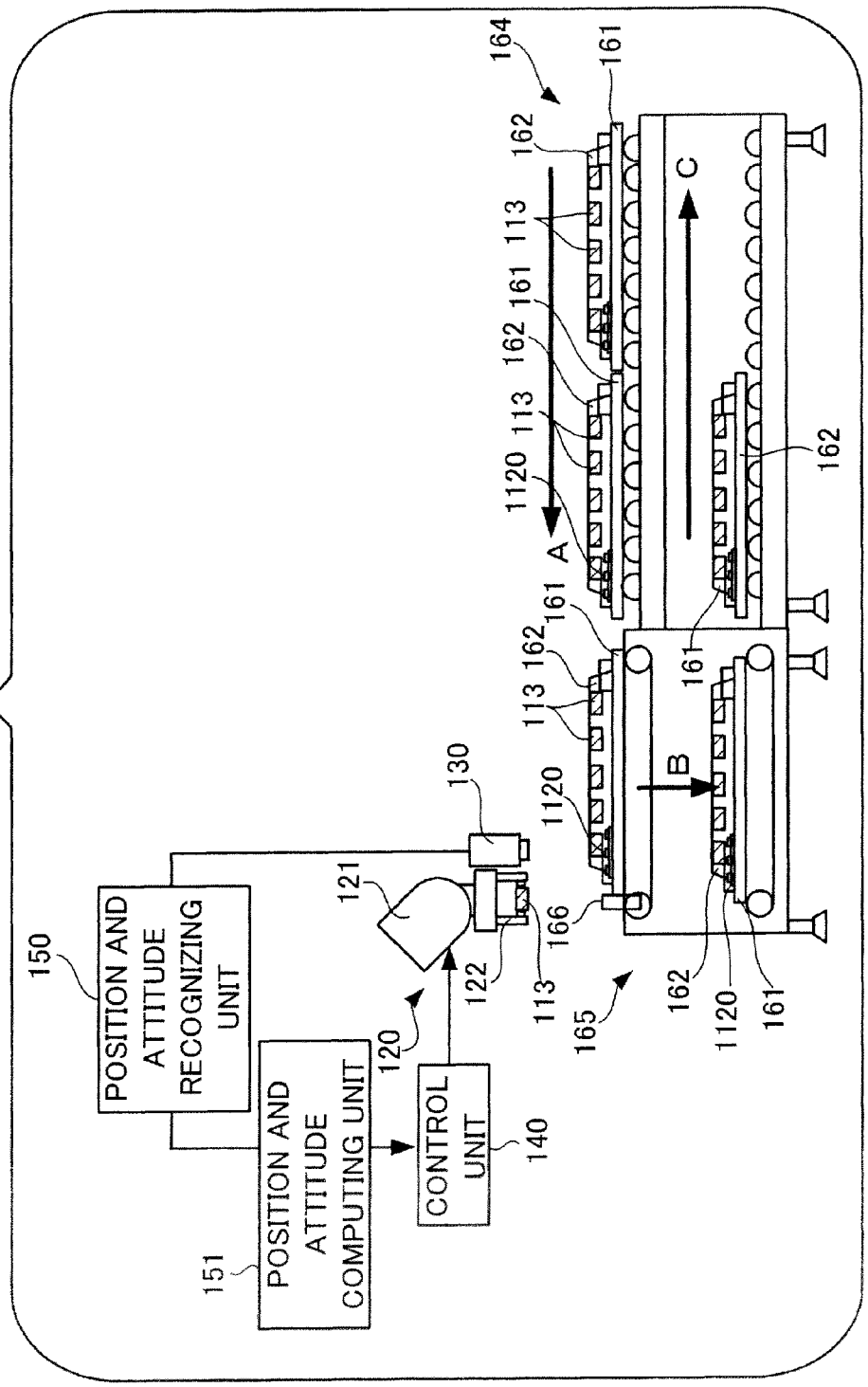
FIGS. 4 and 5 are explanatory views illustrating a component extracting method according to a first exemplary embodiment of the invention.
Figure 4B:
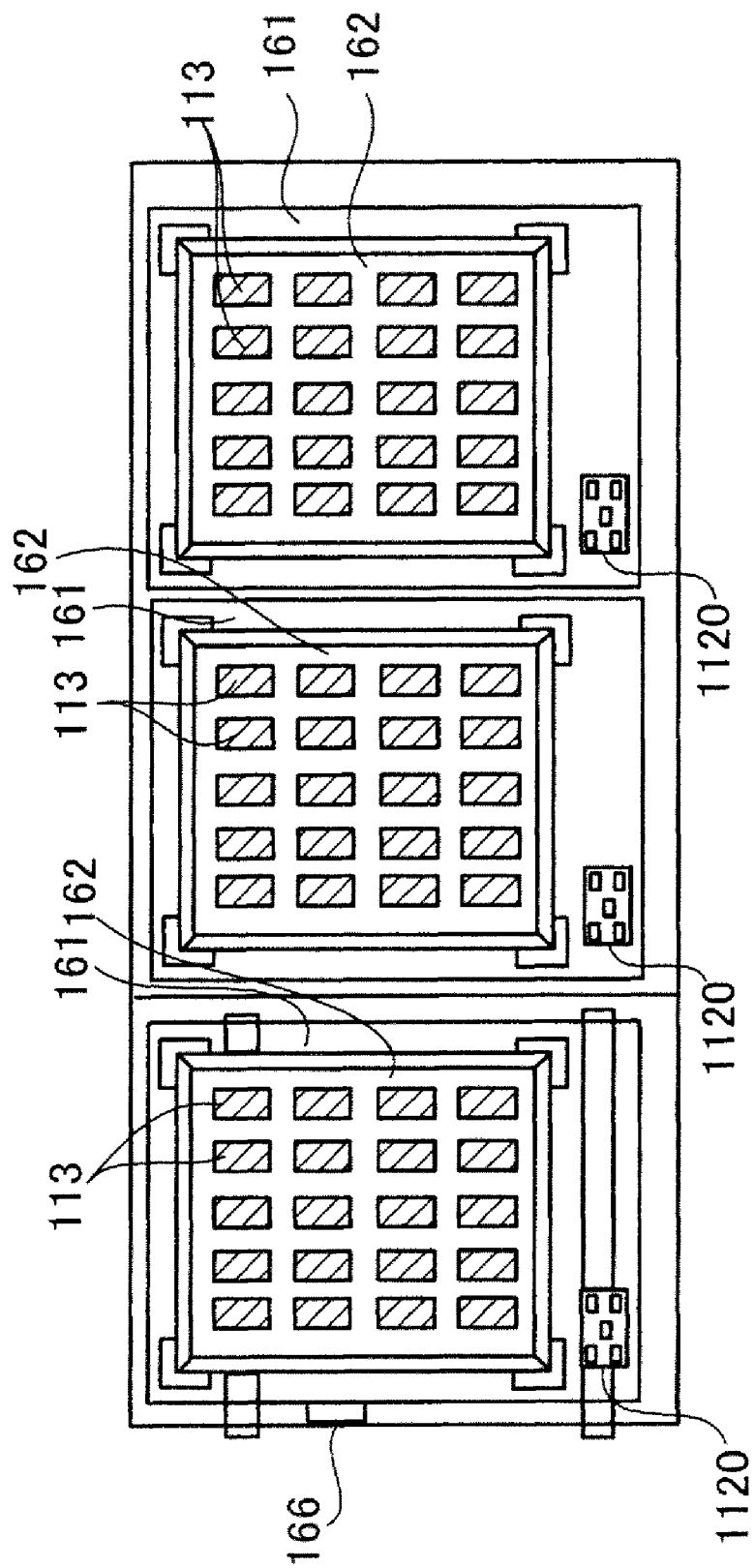
Figure 5:
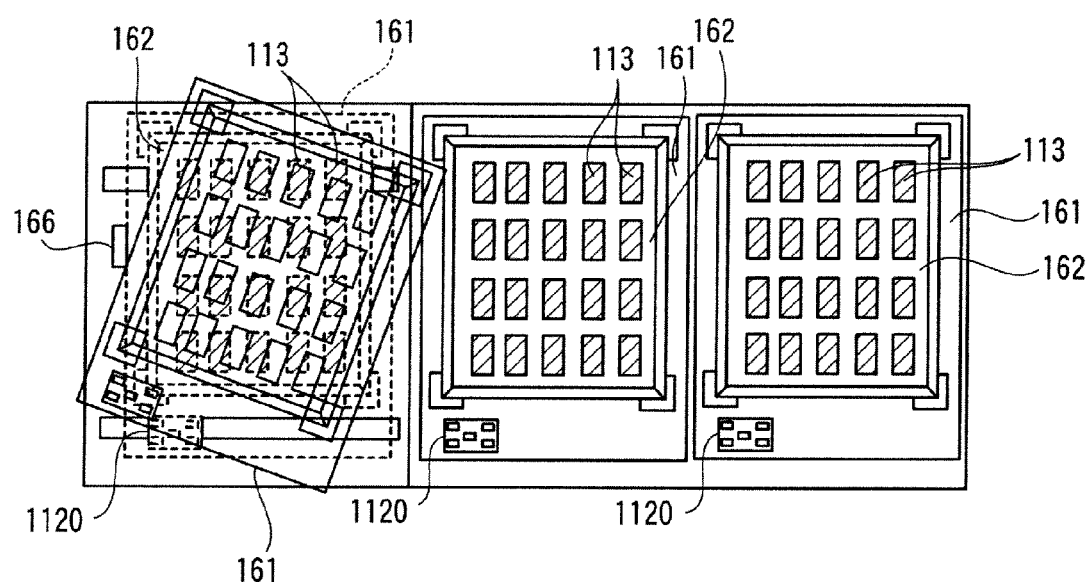

FIGS. 4A and 4B are views similar to that of FIGS. 1A and 1B. FIGS. 4 and 5 are explanatory view illustrating a component extracting method according to a first exemplary embodiment of the invention.

FIG. 4A is a side view illustrating a conveying mechanism that conveys an alignment tray 162 on which components 113 are put, and FIG. 4B is a plan view of the conveying mechanism.

Referring to FIGS. 4A and 4B, the conveying mechanism includes an alignment tray loading plate 161 on which the alignment tray 162 is loaded, and the LED board 1120 (see FIG. 3) is mounted on the alignment tray loading plate 161. An example in which the LED board 1120 is directly mounted on the alignment tray will be described later.

In the example of FIGS. 4A and 4B, the alignment tray 162 on which the components 113 are put is placed on the conveying stage 164 while loaded on the alignment tray loading plate 161, the alignment tray 162 is conveyed in the direction of the arrow A, and the alignment tray 162 located at a leading end in the A-direction is placed on a lifting and lowering mechanism 165, and the alignment tray 162 is stopped by abutting on an abutment 166.

As with the conventional component extracting method of FIGS. 1A and 1B, frequently the alignment tray loading plate 161 is placed on the conveying stage 164 in a cursory attitude, and sometimes the alignment tray 162 is inclined when abutting on the abutment 166 of the lifting and lowering mechanism 165. Therefore, sometimes the alignment tray 162 is stopped with the displacement or inclination as illustrated in FIG. 5.

The component assembling method of the first exemplary embodiment will be described with reference to FIGS. 4A and 4B.

The alignment tray loading plate 161 is conveyed in the direction of the arrow A by the conveying stage 164 while loading many components 113 thereon, and the alignment tray loading plate 161 is stopped by abutting on the abutment 166 of the lifting and lowering mechanism 165. The LED board 1120 of FIG. 3 is provided in a predetermined position of the alignment tray loading plate 161. In the first exemplary embodiment, the LED board 1120 corresponds to an example of the measured object of the invention.

A robot 120 is installed above the position where alignment tray loading plate 161 is stopped. The robot 120 includes a robot arm 121 and a robot hand 122 used to extract the component 113. The camera 130 is fixed to the robot hand 122.

The camera 130 is used in the measurement, and a control unit 140 controls an operation of the camera 130. The control unit 140 also controls the position and attitude of the robot 120. The control unit 140 acts as both the image-taking control unit and component extraction control unit of the invention, and the control unit 140 also corresponds to the control unit of the invention. The control unit 140 includes a computer and a control program executed by the computer.

When the camera 130 takes the images of LEDs 1121 and 1122, a position and attitude recognizing unit 150 can accurately specify the position and attitude of the reference plane, that is, the position and attitude of the alignment tray loading plate 161 on which the LED board 1120 is fixed to the top surface of the alignment tray loading plate 161 in FIG. 3 based on the images of LEDs 1121 and 1122.

When the position and attitude of the alignment tray loading plate 161 are accurately specified, a position and attitude computing unit 151 computes the position and attitude of the component 113 based on the position and attitude of the alignment tray loading plate 161, the robot hand 122 faces the component 113 of the alignment tray loading plate 161 under the control of the control unit 140 as illustrated in FIGS. 4A and 4B, and the component 113 is accurately grasped and extracted.

In the first exemplary embodiment, the camera 130 and the robot 120 are integral with each other. Alternatively, the camera 130 and the robot 120 may be spaced apart from each other. When the camera 130 and the robot 120 are spaced apart from each other, although the moving mechanisms for the robot 120 and camera 130 are separately required, it is not necessary that the robot 120 perform a useless operation for the imaging, and it is not necessary that the camera 130 perform a useless operation for extracting the component 113. Therefore, a lifetime extension of the moving mechanism may be expected because the useless motion is reduced.

As to a method of supplying electric power to light LEDs 1121 and 1122, a battery is mounted on the LED board 1120, and the battery may supply the electric power to LEDs 1121 and 1122. Alternatively, a coil or an antenna is mounted on the LED board 1120, and the electric power may be supplied from the outside by electromagnetic induction or radio wave to light LEDs 1121 and 1122. In such cases, it is not necessary to mount the expendable battery on the LED board 1120, thereby improving maintenance reliability.

A retroreflector may be used instead of LEDs 1121 and 1122 of the first exemplary embodiment. The retroreflector has a characteristic in which light incident to the retroreflector is reflected in the incident direction. The retroreflectors are disposed instead of LEDs 1121 and 1122, the retroreflectors are illuminated with light from the side of the camera 130, and the light reflected from the retroreflector is received by the camera 130. The measurement equal to that of LEDs 1121 and 1122 can be performed, and no electric power is required for the retroreflector, thereby improving the maintenance reliability.

In the case of the retroreflector, it is not necessary to supply the electric power to the side of assembly plate 110, or it is not necessary to place an electric power supply on the side of assembly plate 110. Therefore, the retroreflector is suitable to an explosion-proof environment.

In FIGS. 4A and 4B, the camera 130 takes the image from immediately above the LED board 1120. As described above, the measurement accuracy is enhanced in the case of use of the operation method in which the camera 130 is moved obliquely upward with respect to the LED board 1120 to use displacement between LEDs 1121 and LED 1122 on the LED board 1120.

Thus, the component extracting method and component extracting apparatus, in which the robot can securely grasp and extract the component supported in the predetermined position on the alignment tray, can be realized in the first exemplary embodiment.

FIGS. 6 to 9 illustrate processes of a component extracting method according to a second exemplary embodiment of the invention.

In FIGS. 6 to 9, the same constituent as the first embodiment of FIGS. 4A and 4B is designated by the same numeral, and the description is omitted. The component extracting method of the second exemplary embodiment differs from that of the first exemplary embodiment in that the LED board 1120 in FIG. 3 is placed on the alignment tray 111.

Figure 6:
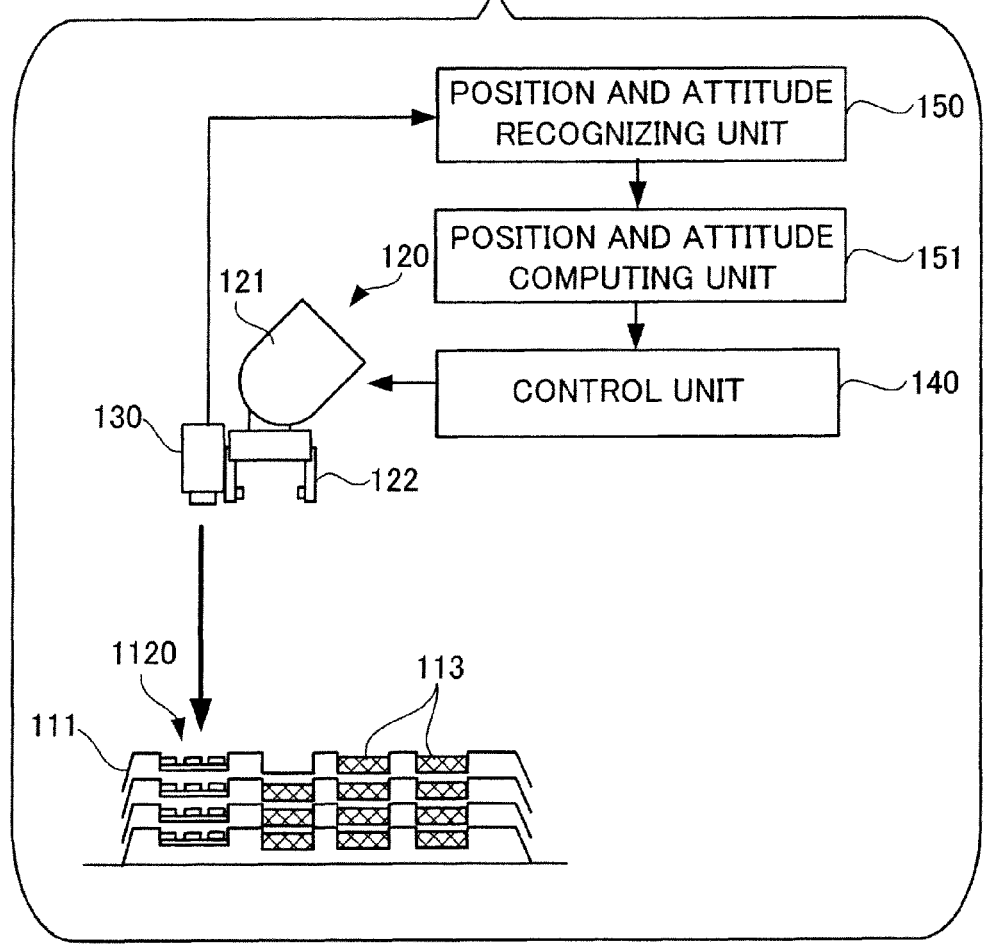
FIGS. 6 through 9 illustrate processes of a component extracting method according to a second exemplary embodiment of the invention.

In the component extracting method of the second exemplary embodiment, when the robot 120 is located in an initial position as illustrated in FIG. 6, the camera 130 takes the image of the LED board 1120 on the alignment tray 11 located in the uppermost stage in the stacked alignment trays 111.

When the robot 120 is located in the initial position, the camera 130 is located immediately above the LED board 1120. A worker roughly stacks alignment trays 111, and the camera 130 is located immediately above the LED board 1120 when the alignment tray 111 is placed in a standard position. Therefore, sometimes the LED board 1120 is deviated from immediately below the camera 130 depending on the position in which the alignment tray 111 is actually placed. However, it is assumed that the LED board 1120 sufficiently enters a view angle of the camera 130 when the robot 120 is located in the initial position.

As illustrated in FIG. 6, when the robot 120 is located in the initial position, the camera 130 performs a first-stage measurement of position and attitude.

In the LED board 1120, one LED 1122 is located slightly above other LEDs 1121 (see FIG. 3). In the case of the first-stage measurement, the camera 130 is located immediately above the LED board 1120, and the measuring method has relatively low distance resolution. Therefore, even if one LED 1122 is located slightly above other LEDs 1121, because LED 1122 does not contribute too much to the improvement of the accuracy for specifying the position and attitude of the LED board 1120, the position and attitude are specified with relatively low accuracy in the first-stage measurement. In the second exemplary embodiment, the position and attitude of the LED board 1120 are obtained with accuracy higher than that of the first-stage measurement.

Figure 7:
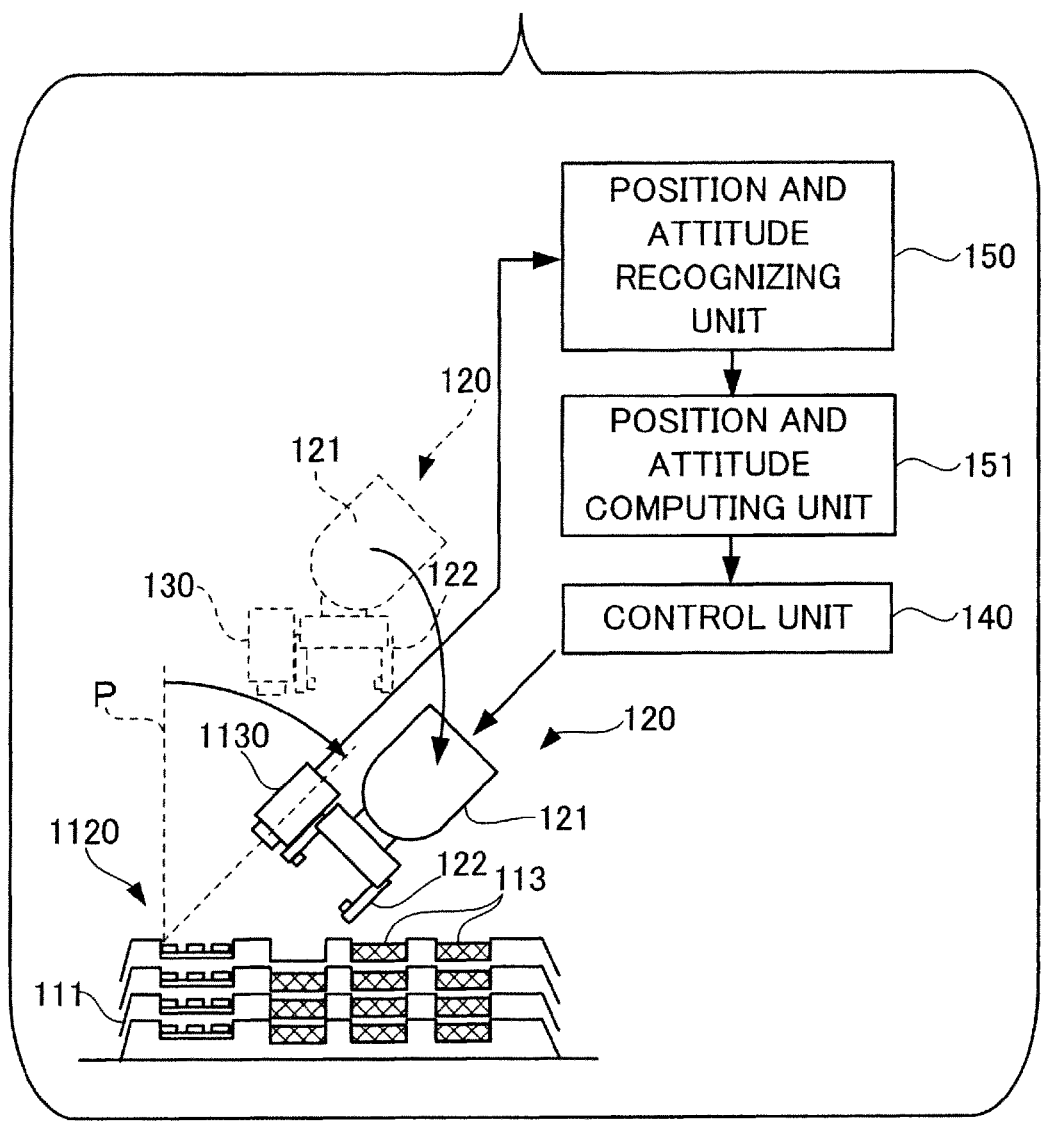

Therefore, based on the position and attitude of the LED board 1120 obtained by the first-stage measurement, the robot 120 is moved to a position in which the measurement can accurately be performed in principle (see FIG. 7). The position in which the measurement can accurately be performed is a position in which an imaging optical axis is not matched with a perpendicular to the LED board 1120 from the camera 130, and the position in which the measurement can accurately be performed is a position in which LED 1122 located slightly above other LEDs 1121 in FIG. 3 is largely displaced on the image taken with the camera 130.

In the second exemplary embodiment, not only the position of the camera 130 is moved, but also the attitude of the camera 130 is changed such that the LED board 1120 is placed on an imaging optical axis of the camera 130.

Figure 8:
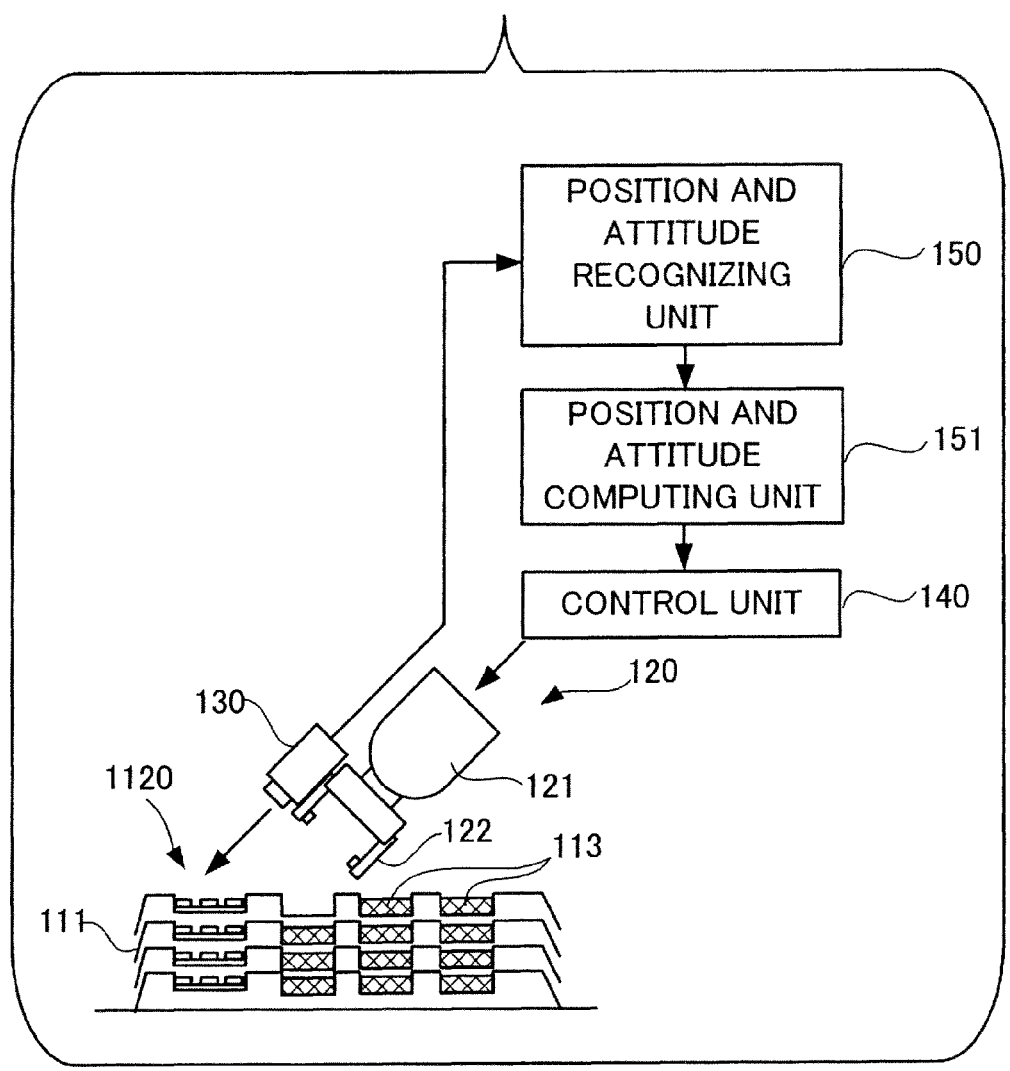

A second-stage measurement is performed after the camera 130 is moved to the position in which the measurement can accurately be performed (see FIG. 8).

In the second-stage measurement, because LED 1122 in FIG. 3 is located slightly above the plane (surface of the LED board 1120) formed by other LEDs 1121, LED 1122 is displaced on the image taken with the camera 130, thereby obtaining the position and attitude of the LED board 1120 with high accuracy.

The position and attitude of the LED board 1120 are accurately specified by the second-stage measurement, the position and attitude of the alignment tray 111 on which the LED board 1120 is placed in the predetermined position are also accurately specified, and the position and attitude of each of the plural components 11 put in the predetermined positions on the alignment tray 111 are also accurately specified.

Figure 9:
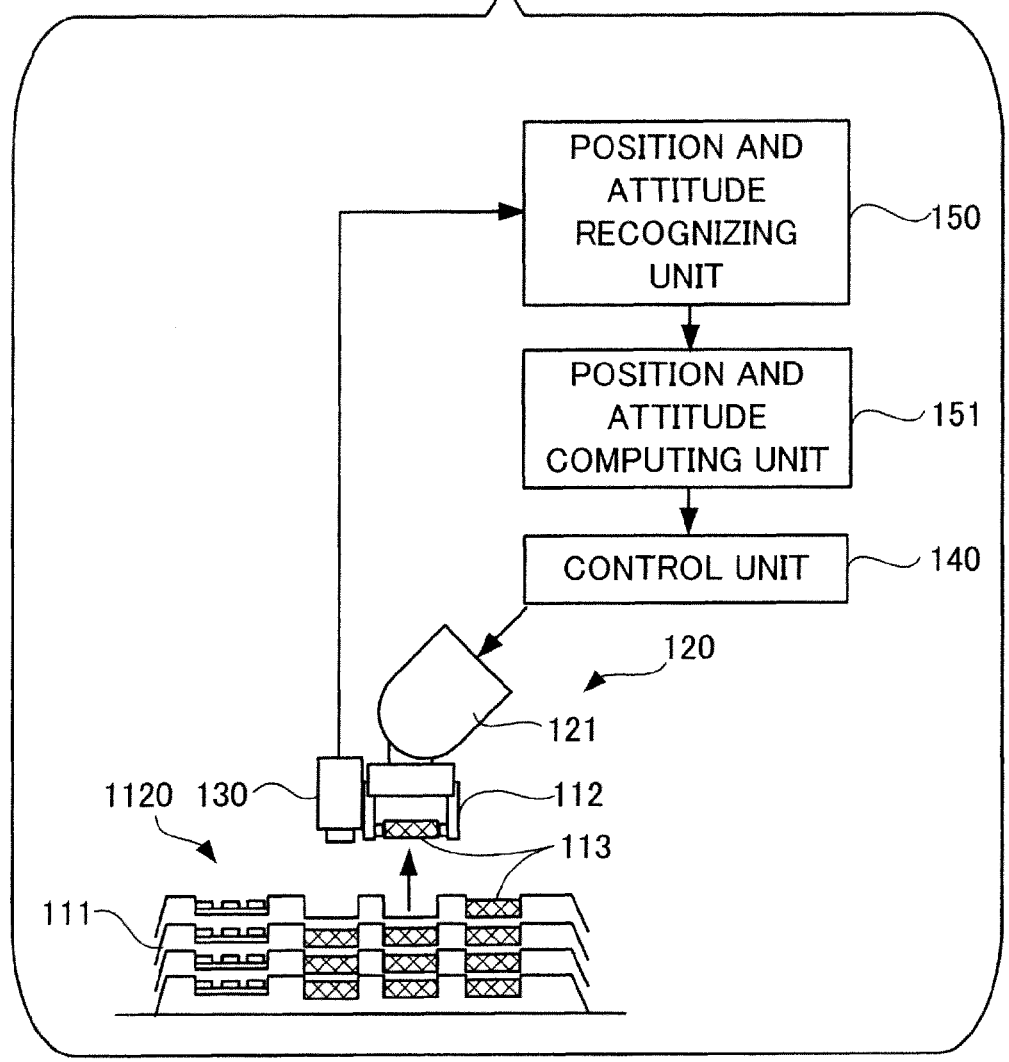

As illustrated in FIG. 9, the robot hand 122 is placed in the position and attitude while facing the component 113 to be extracted from the alignment tray 111, and the robot hand 122 grasps the component 113 to extract the component 113 from the alignment tray 111. Because the position and attitude of the component 113 to be extracted are accurately specified, a risk of failing to grasp the component 113 by the robot hand 122 or a risk of failing to grasp the component 113 by the robot hand 122 to extract the component 113 from the alignment tray 111 may be largely reduced.

All the components 113 in the uppermost alignment tray 111 are extracted, and the uppermost alignment tray 111 becomes empty. Then the uppermost alignment tray 111 is detached from the stacked alignment trays 111, and the similar work is performed to the new uppermost alignment tray 111.

In the second exemplary embodiment, the uppermost empty alignment tray 111 may manually be detached, or the robot 120 may detach the uppermost empty alignment tray 111. The configuration in which the alignment tray 111 is detached with the robot 120 will be described later with reference to parts (a) to (f) of FIG. 10.

In the second exemplary embodiment illustrated in FIGS. 6 and 9, as illustrated in FIGS. 7 and 8, the camera 130 is moved to take an oblique attitude so as to be orientated toward the LED board 1120 in the second-stage measurement. Alternatively, the camera 130 is orientated toward the same direction as the perpendicular P, and the images of LEDs 1121 and 1122 on the LED board 1120 may be taken with the camera 130 in the position displaced from the center of the image. In such cases, because an aberration of the imaging lens of the camera 130 is caused by the displacement of the LEDs 1121 and 1122 from the center of the image, preferably, the aberration of the imaging lens may be taken into account.

In the second exemplary embodiment, when the position and attitude of the LED board 1120 are specified, the measurement is divided into the first-stage measurement and the second-stage measurement to perform the accurate measurement. When the placement position and attitude of the alignment tray 111 are predicted to be not largely varied, the first-stage measurement may be omitted, and the second-stage measurement may directly be performed to specify the directions and distances of LEDs 1121 and 1122 on the assumption that the LED board 1120 is in the standard position and attitude.

A process in which the uppermost alignment tray 111 in the stacked alignment trays 111 is detached and stacked in another site by the robot 120 will be described.

Figure 10:
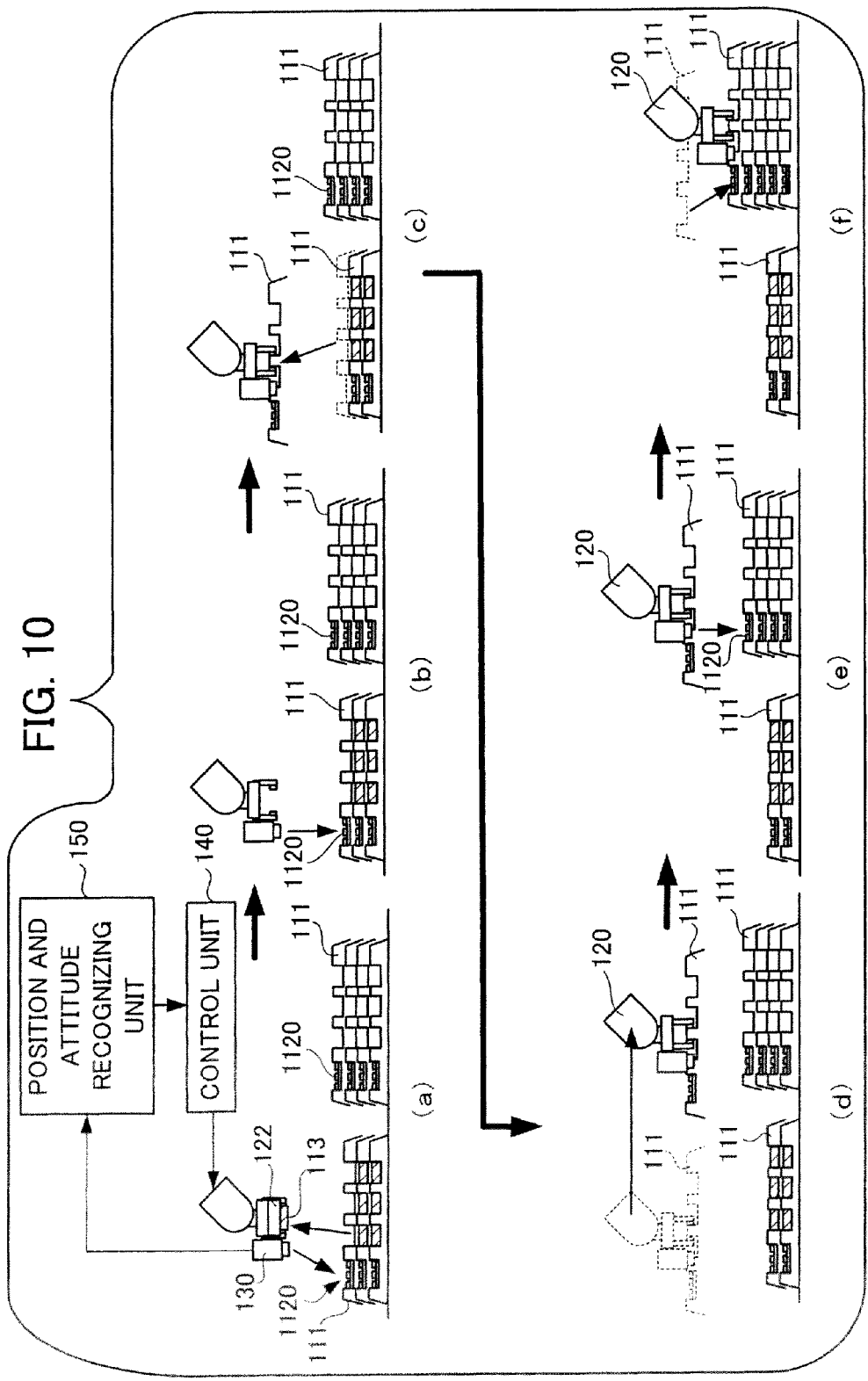
FIG. 10 is a view explaining the process in which the uppermost alignment tray in the stacked alignment trays is detached and stacked in another site by a robot.

Parts (a) to (f) of FIG. 10 are views explaining the process in which the uppermost alignment tray 111 in the stacked alignment trays 111 is detached and stacked in another site by the robot 120.

Parts (a) to (f) of FIG. 10 sequentially illustrate the process.

Part (a) of FIG. 10 illustrates a state in which the robot 120 extracts all the components 113 from the uppermost alignment tray 111 in the component extracting process after the recognizing process of FIGS. 6 to 9.

In part (a) of FIG. 10, the control unit 140 includes a counter, the control unit 140 uses the counter to count the number of components every time the robot 120 extracts the component 113 from the alignment tray 111 (see FIGS. 6 and 9), and the control unit 140 determines whether the value counted with the counter reaches the number of components on the alignment tray 111. When determining that the alignment tray 111 becomes empty, the control unit 140 moves the robot 120 and the camera 130 onto the LED board 112, and the control unit 140 recognizes the position and attitude of the LED board 1120 again to confirm the position in which the alignment tray 111 is grasped (see part (b) of FIG. 10). At this point, unlike the conventional measuring method (two-dimensional recognition), the attitude of the alignment tray can three-dimensionally be recognized based on the image expressing the fourth LED on the LED board 1120. As illustrated in part (c) of FIG. 10, the robot 120 grasps a projection located in the center of the alignment tray 111, and the robot 120 detached the empty alignment tray 111. As illustrated in part (d) of FIG. 10, the robot 120 moves the grasping alignment tray 111 to another site. The robot 120 moves the empty alignment tray 111, and the camera 130 reaches the neighborhood of the position in which the empty alignment trays 111 are stacked. At this point, the control unit 140 causes the camera 130 to take the image of the LED board 1120 to confirm the site where the empty alignment trays 111 are stacked, and the moved alignment tray 111 is stacked on the uppermost alignment tray 111 in the stacked empty alignment trays 111. Then the control unit 140 returns the robot 120 to the state of part (a) of FIG. 10, and the robot 120 starts to extract the component 113 on the next alignment tray 111.

In parts (a) to (f) of FIG. 10, the control unit 140 uses the counter to count the number of components every time the robot 120 extracts the component 113, and the control unit 140 determines whether the alignment tray becomes empty. Alternatively, LED is provided in each position in which the component 113 is supported by the alignment tray 111, the light emitted from LED is obstructed by the existence of the component 113 while the component is supported by the alignment tray 111, the light emission appears by the extraction of the component 113, and the control unit 140 may count the number of LEDs in which the light emission appears, thereby determining whether the alignment tray 111 becomes empty.

Figure 11B:
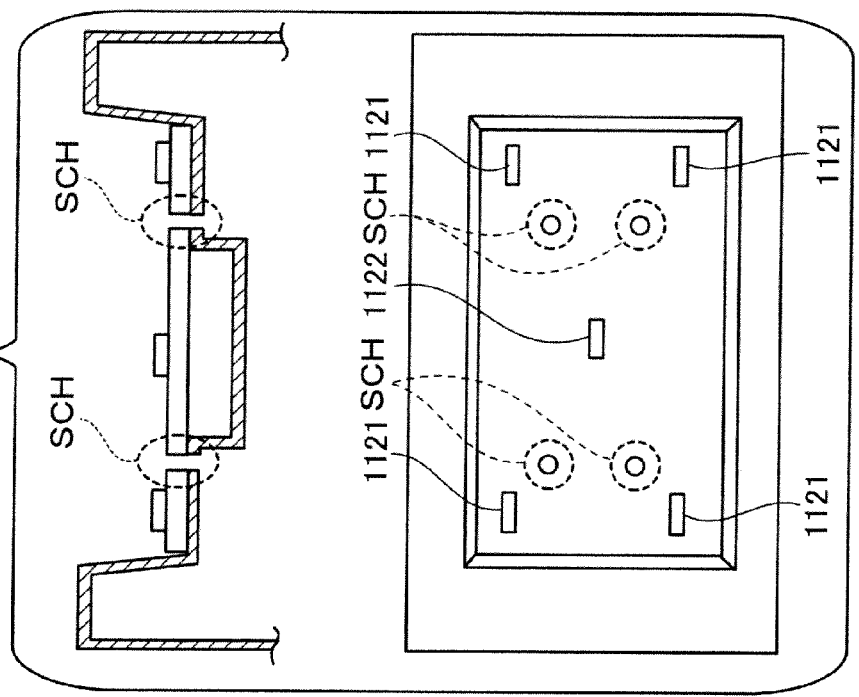
FIGS. 11A and 11B illustrate a LED board fixed to the alignment tray.
Figure 11A:
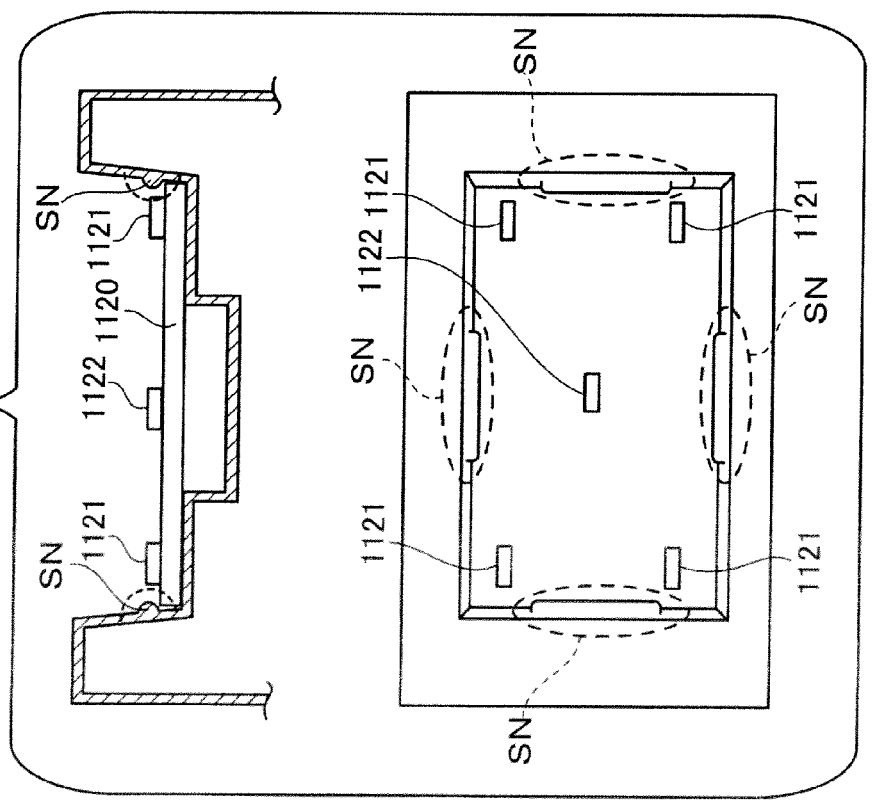

FIGS. 11A and 11B illustrate the LED board 1120 fixed to the alignment tray 111, and FIGS. 12A, 12B, 12C, and 12D illustrate positions in which the LED board 1120 or LEDs 1121 and 1122 are fixed to the alignment tray 111.

In the second exemplary embodiment, it is necessary that geometric arrangement positions of the LED board 1120 and the component 113 previously positioned in the alignment tray 111 are clear.

FIG. 11A illustrates a state, in which fixing portions called snap-fit joint SN are provided in the alignment tray 111 and the LED board 1120 is fixed to the alignment tray 111 by the snap-fit joints SN. FIG. 11B illustrates the alignment tray 111 having a configuration in which screws are inserted in screwing holes SCH to fix the LED board 1120 to the alignment tray 111. Both the configurations of FIGS. 11A and 11B may be employed, and any configuration may be employed as long as the LED board 1120 is fixed to the alignment tray 111 such that the geometric arrangement positions of the component 113 and LEDs 1121 and 1122 on the LED board 1120 are unambiguously determined.

The LED board 1120 may be located in an end portion of the alignment tray 111 as illustrated in FIG. 12A, and The LED board 1120 may be located in the center of the alignment tray 111 as illustrated in FIG. 12B. As illustrated in FIG. 12C, two LED boards 1120 may be provided at diagonal positions of the alignment tray 111. The measurement accuracy is enhanced when the two LED boards 1120 are provided at diagonal positions. As illustrated in FIG. 12D, LEDs 1121 and 1122 may be provided in the center and four corners of the alignment tray 111.

A component assembling method will be described below.

First, a conventional component assembling method will be described as a comparative example. Then, a novel measuring method applied to a component assembling method of the invention will be described, and various exemplary embodiments of the invention will be described.

Figure 13:
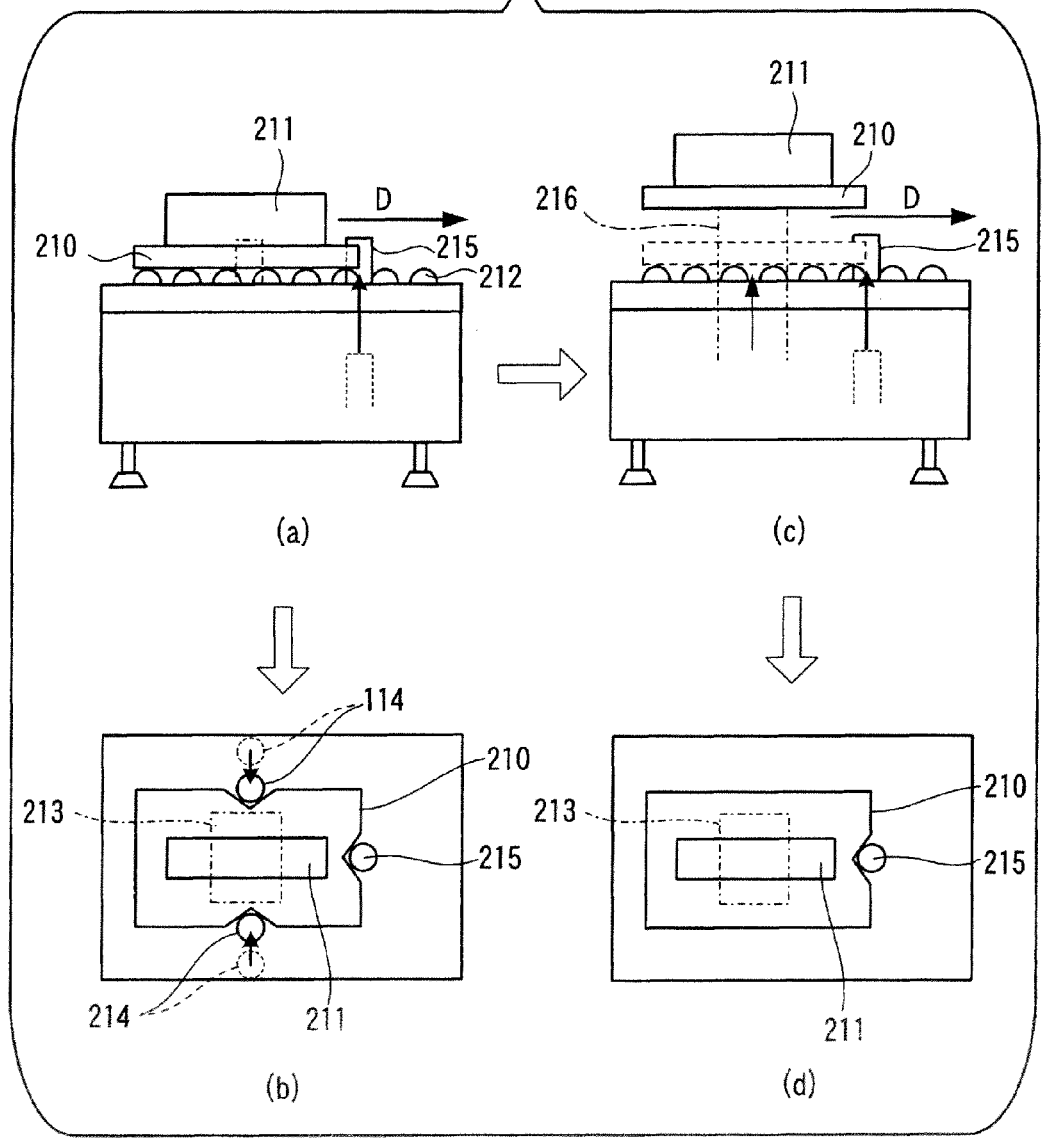
FIG. 13 is an explanatory view of a conventional component assembling method.

Parts (a) to (f) of FIG. 13 are explanatory views of a conventional component assembling method.

Part (a) of FIG. 13 illustrates a state in which an assembly pallet 210 is stopped at an assembly point by colliding with an abutment 215 when conveyed to the assembly point.

Part (b) of FIG. 13 illustrates a state in which the assembly pallet 210 is positioned by the positioning pin 214 to assemble the second component 213 in order to prevent the movement of the assembly pallet 210 after the state of Part (a) of FIG. 13

Part (c) of FIG. 13 illustrates a state in which, instead of positioning the assembly pallet 210 by the positioning pin 214, a lifting and lowering mechanism 216 is used to lift and position the assembly pallet 210 immediately after the assembly pallet 210 is stopped.

Part (d) of FIG. 13 illustrates manipulation of a first component 211. More particularly, part (d) of FIG. 13 illustrates a state in which a second component 213 is assembled in the first component 211 after the state of part (c) of FIG. 13. Although not illustrated, the robot is placed in the assembly point, and the second component 213 is automatically assembled in the first component 211 on the assembly pallet by the robot after the assembly pallet is stopped. In the following description, it is assumed that the robot is placed in the assembly point to assemble the second component 213 in the first component 211.

A conventional component assembling method will be described with reference to parts (a) to (d) of FIG. 13.

The first component 211 is put on the assembly pallet 210. The assembly pallet 210 is conveyed in a direction of an arrow D by a conveying stage 212 while the first component 211 is put thereon, and the assembly pallet 210 is stopped in the position of part (a) of FIG. 13 by abutting on an abutment 215 (includes a pin in the example of parts (a) to (d) of FIG. 13). Because the assembly pallet 210 is possibly inclined by the abutment impact at the time the assembly pallet 210 is stopped, a mechanism 214 of part (b) of FIG. 13 or a mechanism 216 of part (c) of FIG. 13 is provided to position the assembly pallet 210 immediately after the assembly pallet 210 is stopped. The positioning pin is slid in the mechanism 214. The assembly pallet 210 is lifted and lowered in the mechanism 216.

The robot assembles the second component 213 in the first component 211 put on the accurately positioned assembly pallet 210.

As described above, in the conventional component assembling method, it is necessary to provide the positioning mechanism and the like, which causes a problem in that the facilities are enlarged.

Various exemplary embodiments of the invention will be described based on the conventional component assembling method.

FIG. 14 is an explanatory view illustrating a novel measuring method used in the following exemplary embodiments.

An LED board 2120 and a camera 230 are illustrated in FIG. 14.

Plural LEDs 2121 and a LED 2122 are disposed on the LED board 2120. LEDs 2121 disposed on the surface of the LED board 2120 and LED 2122 disposed slightly above the surface of the LED board 2120 are fixed to the LED board 2120.

In the following exemplary embodiments, the novel measuring method is used to measure the position and attitude of the LED board 2120, thereby enhancing the measurement accuracy.

The conventional measuring method based on the image taken with the camera 230 is basically as follows. At this point, it is assumed that LEDs 2121 disposed in the surface of the LED board 2120 are measured.

The position and attitude of the camera 230 are previously known, the images of LEDs 2121 on the LED board 2120 are taken with the camera 230, and the directions of LEDs 2121 are obtained when the positions of the images of LEDs 2121 are viewed from the camera 230. The directions of LEDs 2121 viewed from the camera 230 are obtained because a relative positional relationship among LEDs 2121 is previously known. The plane defined by LEDs 2121, that is, the position and attitude of the LED board 2120 are obtained from the pieces of information. Alternatively, dimensions of the images of LEDs 2121 may be utilized by using the camera 230 on which an imaging lens having a large spherical aberration is mounted. When the camera 230 on which the imaging lens having the large spherical aberration is mounted is used, the images of LEDs 2121 become indistinct images having substantially elliptical shapes, and the dimensions of the image depend on a distance from the camera 230 to each LED 2121. With this phenomenon, the distance from the camera 230 to each LED 2121 is obtained based on dimensions of the image of LED 2121.

When the directions and distances of three LEDs 2121 on the LED board 212 are obtained, the three-dimensional positions of three LEDs 2121 are obtained, and the position and attitude of the reference plane defined by three LEDs 2121 are obtained, that is, the position and attitude of the LED board 2120 on which the three LEDs 2121 are disposed are obtained. The two conventional measuring methods may be used at the same time. In FIG. 14, four LEDs 2121 are disposed on the surface of the LED board 2120. The fourth LED 2121 is used to improve the accuracy when in measuring the position and attitude of the LED board 2120. Alternatively, the position of the fourth LED 2121 may be changed for each LED board 2120, and the fourth LED 2121 may act as ID for specifying the LED board.

When the LED board 2120 is fixed to a predetermined position of the assembly pallet 210 of FIGS. 13A, 13B, 13C, and 13D, the position and attitude of the LED board 2121 are obtained, and the position and attitude of the first component 211 on the assembly pallet 210 are obtained. When the position and attitude of the first component 211 supported by the assembly pallet 210 are obtained, the first component 211 can correctly be assembled in the second component 211 on the assembly pallet 210 even if the assembly pallet 210 is inclined.

In the above-described conventional measuring methods, although the direction of each LED 2121 viewed from the camera 230 is measured with significantly high accuracy, the accuracy of distance between the camera 230 and each LED 2121 is lower than the accuracy of direction.

Therefore, another LED 2122 is added to improve the resolution of the distance.

As described above, the additional LED 2122 is disposed while perpendicularly spaced apart from the reference plane (overlapped with the surface of the LED board 2120).

In FIG. 14, the camera 230 is disposed in a posture, in which the camera 230 is orientated toward the reference plane from a position where the optical axis of the imaging lens is not matched with a perpendicular P passing through LED 2122 to the surface (the triangular reference plane formed by three LEDs 2121) of the LED board 2120. When the images of LEDs 2121 and 2122 are taken with the camera 230 while the camera 230 is disposed in the position where the imaging optical axis is not matched with the perpendicular P, a difference in relative position on the imaging screen between LEDs 2121 in the surface of the LED board 2120 and one LED 2122 located slightly above the surface of the LED board 2120 is varied according to the imaging direction.

Thus, the novel measuring method may be employed in addition to the conventional measuring methods. In the novel measuring method, by utilizing the difference in relative position on the imaging screen between LEDs 2121 and LED 2122, the position and attitude of the reference plane, that is, the position and attitude of the LED board 2120 of FIG. 14 can be measured with accuracy higher than that of the conventional measuring method, that is, the measurement of the directions and distances of LEDs 2121 disposed in a planar manner in the surface of the LED board 2120.

Figure 15A:
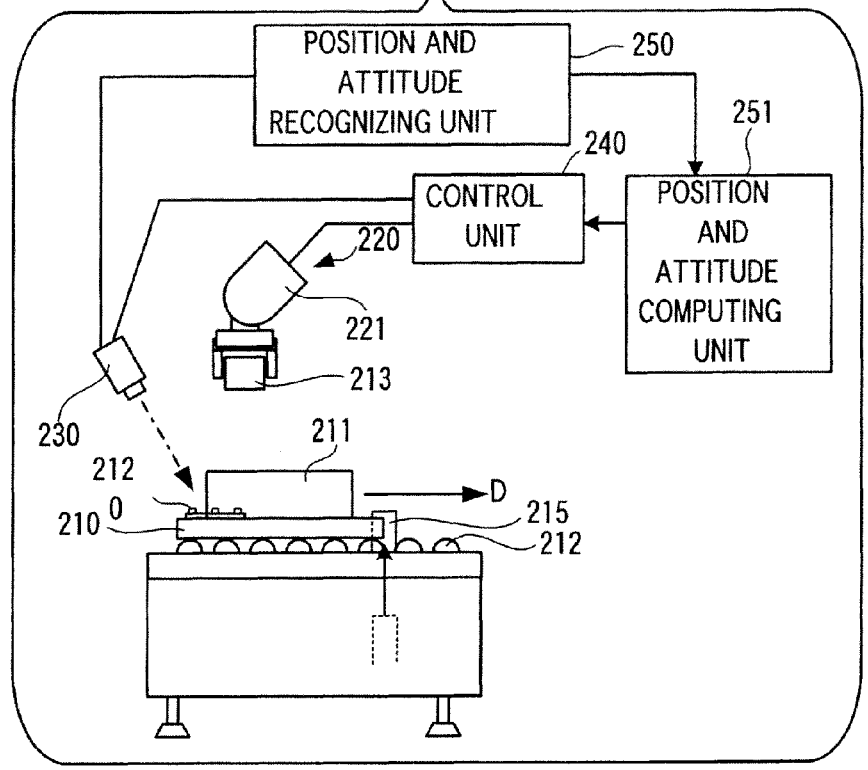
FIGS. 15A, 15B, and 15C are explanatory views illustrating a component assembling method according to a third exemplary embodiment.
Figure 15B:
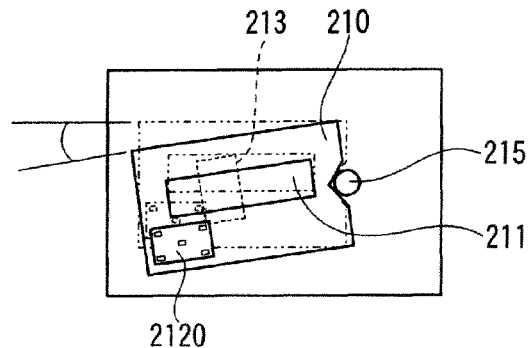
Figure 15C:
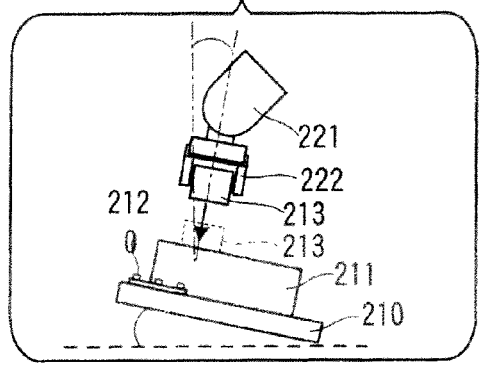

FIGS. 15A, 15B, and 15C are explanatory views illustrating a component assembling method according to a third exemplary embodiment of the invention.

FIGS. 15A, 15B, and 15C illustrate an example in which the novel measuring method of FIG. 14 is employed as similar to parts (a) to (d) of FIG. 13. Although described in detail later, the use of the novel measuring method can eliminate the positioning mechanisms 214 and 216 that are necessary in parts (a) to (d) of FIG. 13.

The component assembling method of the third exemplary embodiment will be described with reference to FIGS. 15A, 15B, and 15C.

FIG. 15A illustrates a state in which the assembly pallet 210 is stopped at the assembly point by the abutment 215 (including a lifting and lowering pin) after the assembly pallet 210 is conveyed to the assembly point. FIGS. 15B and 15C illustrate states in which the assembly pallet 210 is inclined by the impact at the time the assembly pallet 210 is stopped after the state of FIG. 15A.

The first component 211 is placed on the assembly pallet 210. The assembly pallet 210 is conveyed in the direction of the arrow D by the conveying stage 212 while the first component 211 is put thereon, and the assembly pallet 210 is stopped in the position of FIG. 15A by abutting on the abutment 215. The LED board 2120 of FIG. 14 is provided in a predetermined position of the assembly pallet 210. In the third exemplary embodiment, the LED board 2120 corresponds to an example of the measured object of the invention.

The robot 220 is disposed above the assembly pallet 210 stopped at the assembly point. The robot 220 includes the robot arm 221 and a robot hand 222 used to assemble the component 213. The camera 230 is fixed above the LED board 2120 of the assembly pallet 210.

A control unit 240 controls the operation of the camera 230. The control unit 240 controls the position and attitude of the robot 220. The control unit 240 acts as both the image-taking control unit and component extraction control unit of the invention. For example, the control unit 240 includes a computer and a control program executed by the computer.

When the camera 230 takes the image of the LED board 2120, a position and attitude recognizing unit 250 can accurately specify the position and attitude of the reference plane, that is, the position and attitude of the assembly pallet 210 in which the LED board 2120 is fixed to the top surface of the assembly pallet 210 in FIGS. 15A, 15B, and 15C based on the image of the LED board 2120. As with the control unit 240, the position and attitude recognizing unit 250 includes a computer and a position and attitude recognizing program executed by the computer. The computer may be shared by the position and attitude recognizing unit 250 and the control unit 222. A position and attitude computing unit 251 also includes a computer and a position and attitude computing program executed by the computer. The computer may be shared by the position and attitude computing unit 251, the control unit 240, and the position and attitude recognizing unit 250.

Even if the assembly pallet 210 is inclined as illustrated in FIGS. 15B and 15C, the position and attitude of the assembly pallet 210 are accurately specified, the position and attitude computing unit 251 computes the position and attitude of the first component 211 based on the position and attitude of the assembly pallet 210. Therefore, under the instruction of the control unit 240, the robot hand 222 is disposed while facing the first component 211 of the assembly pallet 210 as illustrated in FIG. 15C, and the second component 213 is correctly assembled in the first component 211.

In the third exemplary embodiment, it is assumed that the camera 230 is fixed. Alternatively, the camera 230 may be moved to take the image of the LED board 2120 from an optimal position. When the camera 230 is movable, the camera 230 may rigidly be integral with the robot 220. In such cases, the position and attitude is integrally changed, and the moving mechanism dedicated to the camera 230 can be eliminated.

As to a method of supplying electric power to light LEDs 2121 and 2122, a battery is mounted on the LED board 2120, and the battery supplies electric power to LEDs 2121 and 2122. Alternatively, a coil or an antenna is mounted on the LED board 2120, and the electric power may be supplied from the outside by electromagnetic induction or radio wave to light LEDs 2121 and 2122. In such cases, it is not necessary to mount the expendable battery on the LED board 2120, thereby improving the maintenance reliability.

The retroreflector may be used instead of LEDs 2121 and 2122 of the third exemplary embodiment. The retroreflector has the characteristic in which the light incident to the retroreflector is reflected in the incident direction. The retroreflectors are disposed instead of LEDs 2121 and 2122 on the LED board 2120, the retroreflectors are illuminated with light from the side of the camera 230, and the light reflected from the retroreflector is received by the camera 230. The measurement equal to that of LEDs 2121 and 2122 can be performed, and no electric power is required for the retroreflector, thereby improving the maintenance reliability.

In the case of the retroreflector, it is not necessary to supply the electric power to the side of assembly pallet 210, or it is not necessary to place an electric power supply on the side of assembly pallet 210. Therefore, the retroreflector is suitable to the explosion-proof environment.

A component assembling method according to a fourth exemplary embodiment of the invention will be described below.

Figure 16:
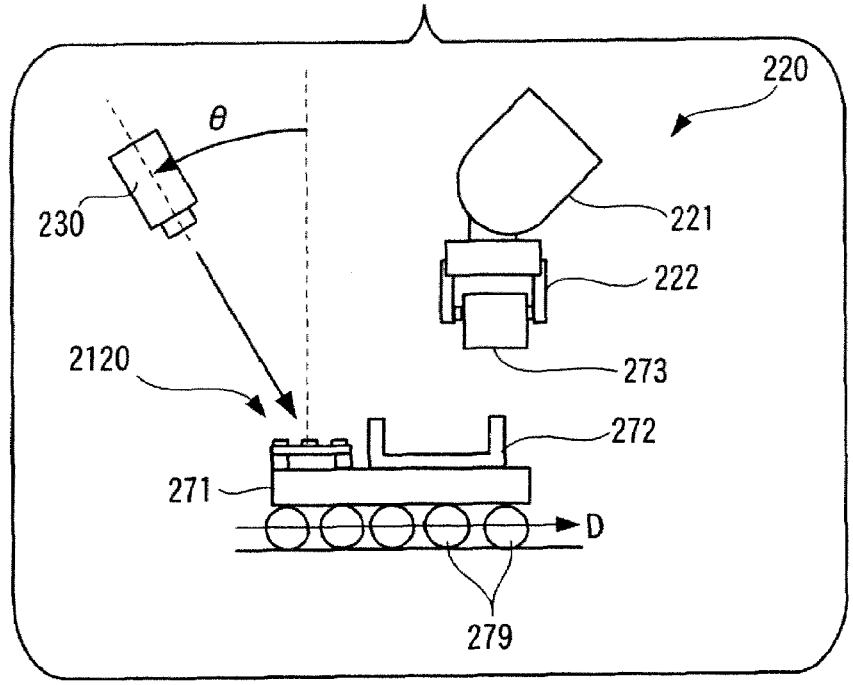
FIG. 16 is an explanatory view illustrating the component assembling method of the fourth exemplary embodiment.
Figure 17:
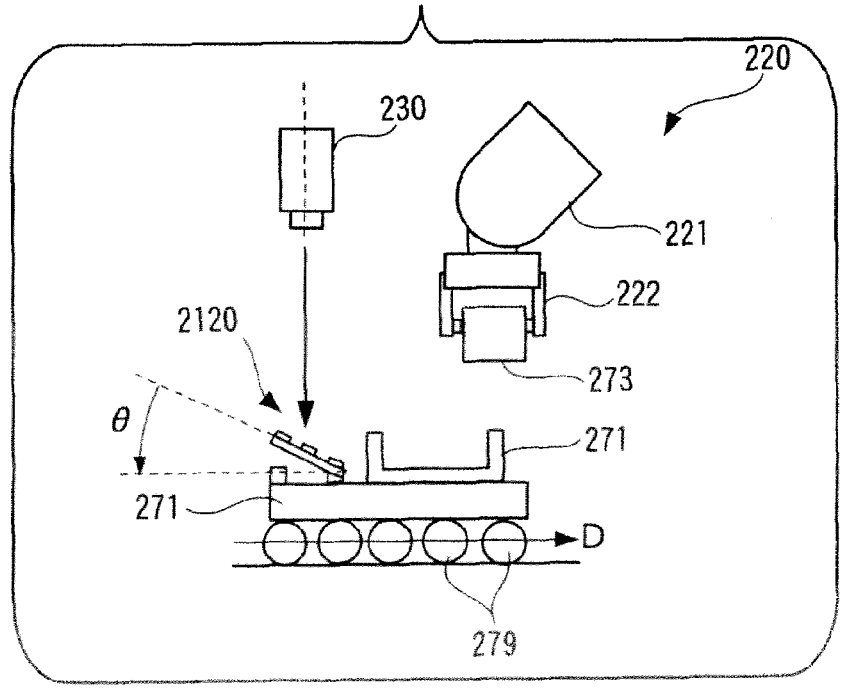
FIG. 17 is an explanatory view illustrating a component assembling method according to a fifth exemplary embodiment.
Figure 18:
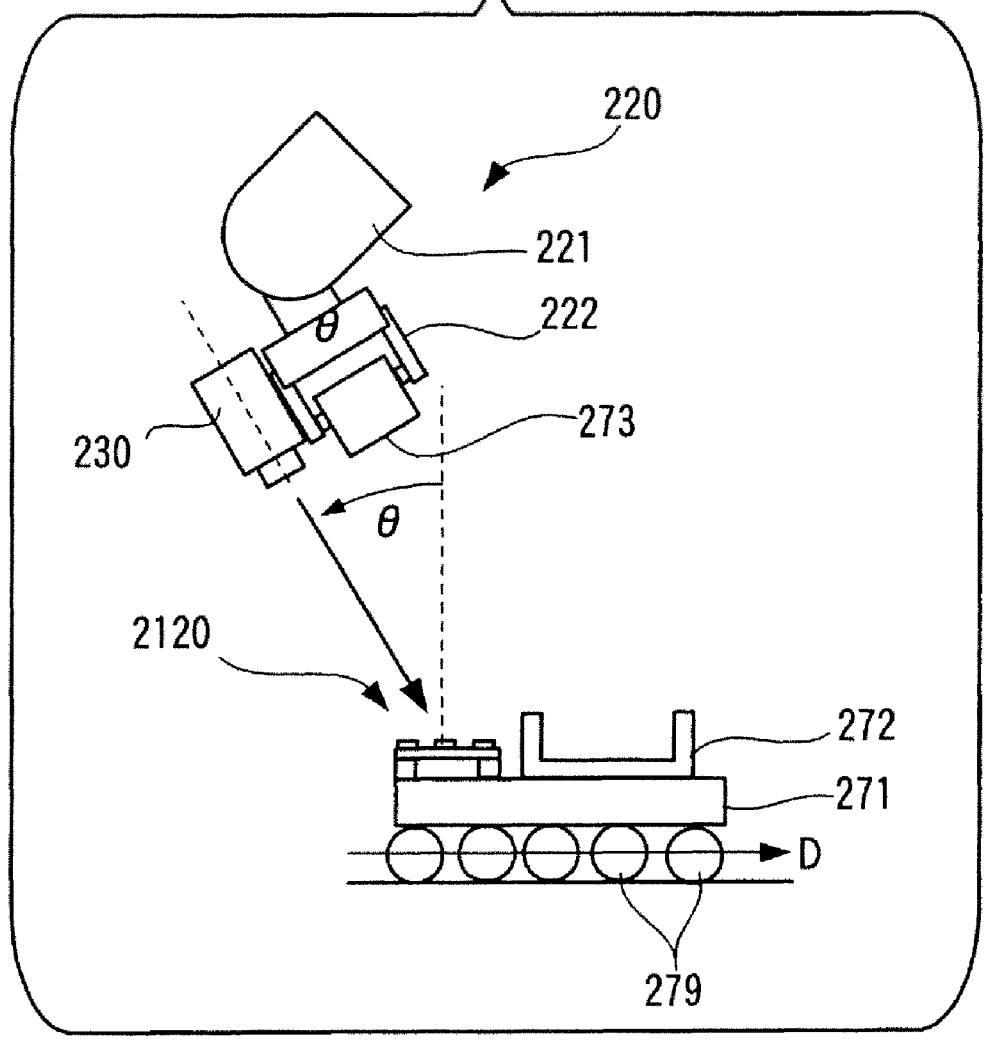
FIG. 18 is an explanatory view illustrating the component assembling method of a sixth exemplary embodiment.

FIG. 16 is an explanatory view illustrating the component assembling method of the fourth exemplary embodiment of the invention. In FIGS. 16 to 18, the position and attitude recognizing unit 250, position and attitude computing unit 251, and control unit 240 illustrated in FIGS. 15A, 15B, and 15C are omitted and referred to as needed.

The component assembling method of the fourth exemplary embodiment illustrated in FIG. 16 is similar to the component assembling method of the third exemplary embodiment illustrated in FIGS. 15A, 15B, and 15C.

The LED board 2120 and a first component 272 are put in predetermined positions on an assembly pallet 271. The LED board 2120 is identical to that of FIG. 14. The assembly pallet 271 is conveyed in the direction of the arrow D by a conveying stage 279 while the LED board 2120 and the first component 272 are put thereon, and the assembly pallet 271 is stopped in the position of FIG. 16 by abutting on an abutment 215 (not illustrated).

The camera 230 is fixed in the position and attitude so as to obliquely take the image of LED board 2120 on the stopped assembly pallet 271. When the position and attitude of the LED board 2120 are obtained, the position and attitude of the first component 272 put in the predetermined position on the same assembly pallet 271 are also obtained.

On the other hand, the robot hand 222 grasps a second component 273. The second component 273 is one that is assembled in the first component 272 on the assembly pallet 271. The robot 220 changes the position and attitude thereof based on the pieces of information on the position and attitude of the first component 272 obtained from the image taken with the camera 230. The robot 220 disposes the second component 273 such that the second component 273 faces the first component 272 on the assembly pallet 271, and the robot 220 assembles the second component 273 in the first component 272.

In the fourth exemplary embodiment, it is assumed that the camera 230 is fixed. Alternatively, a moving mechanism may be provided to change the position and attitude of the camera 230.

FIG. 17 is an explanatory view illustrating a component assembling method according to a fifth exemplary embodiment of the invention. A difference with the fourth exemplary embodiment of FIG. 16 will be described.

In the component assembling method of the fifth exemplary embodiment of FIG. 17, the LED board 2120 is obliquely fixed in a predetermined position of the assembly pallet 271, and the camera 230 is fixed so as to take the image of the obliquely fixed LED board 2120 from immediately above.

Therefore, the camera 230 can be fixed immediately above the LED board 2120 while the position and attitude of the LED board 2120 are accurately obtained by obliquely taking the image of the LED board 2120 with respect to the perpendicular, thereby reducing a facility installation space.

FIG. 18 is an explanatory view illustrating the component assembling method of the sixth exemplary embodiment of the invention. A difference from the fourth exemplary embodiment of FIG. 16 will be described.

The camera 230 is rigidly fixed in the fourth exemplary embodiment of FIG. 16. On the other hand, in the sixth exemplary embodiment of FIG. 18, the camera 230 is fixed to the robot hand 222, and the camera 230 is moved along with the robot hand 222.

As illustrated in FIG. 18, when the camera 230 is fixed to the robot 220, interference between the robot 220 and the camera 230 can securely be avoided during the assembly, and a degree of freedom is improved in moving the robot 220 during the assembly.

The position in which the LED board 2120 is fixed to the assembly pallet 210 will be described.

Figure 19:
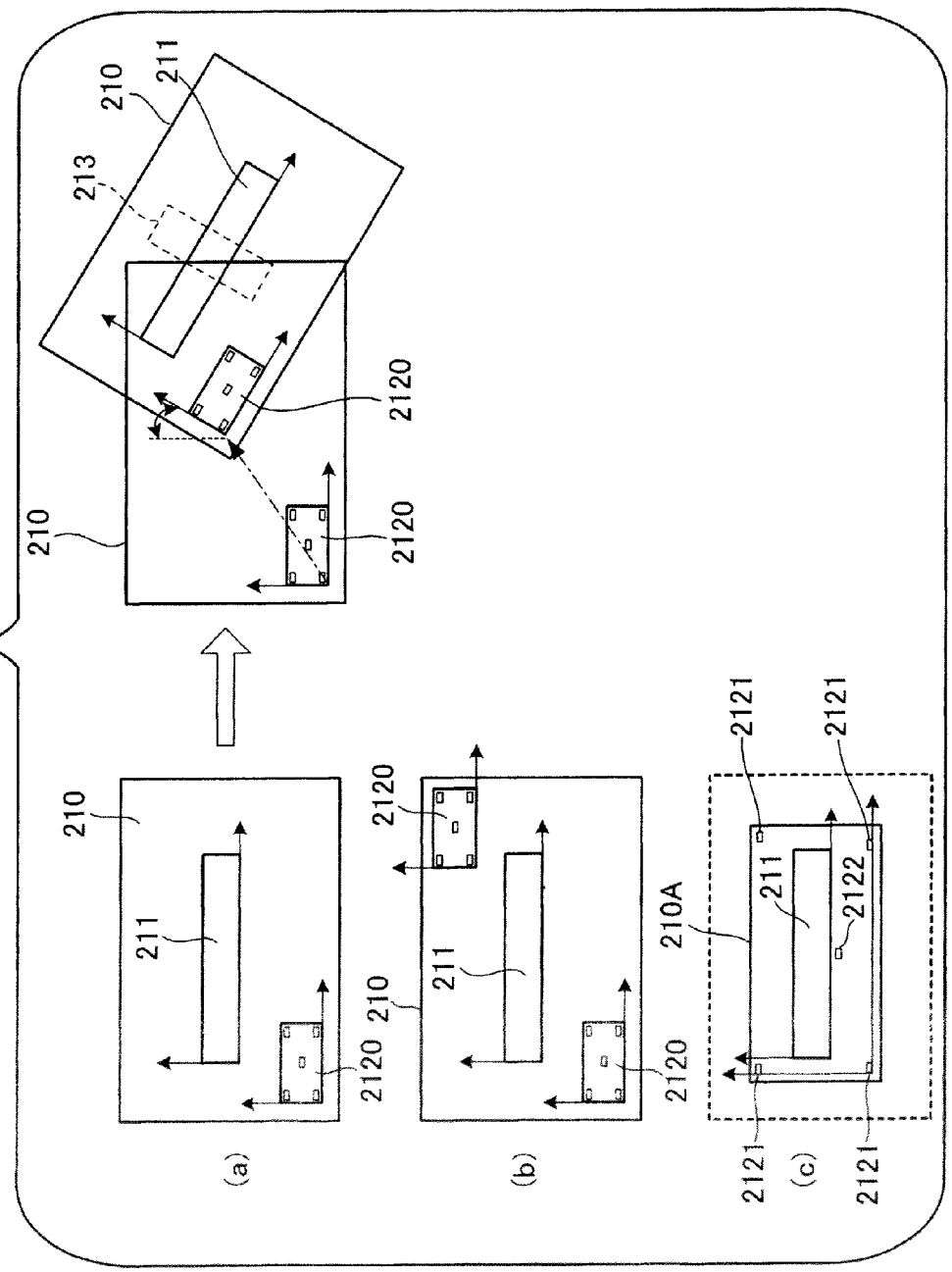
FIG. 19 illustrates a position in which the LED board is fixed.

Parts (a) to (c) of FIG. 19 illustrate a position in which the LED board 2120 is fixed.

Part (a) of FIG. 19 illustrates a position in which the LED board 2120 used in the sixth exemplary embodiment is fixed. When the LED board 2120 is fixed to the position of part (a) of FIG. 19, even if the assembly pallet 210 is rotated as illustrated in the right of part (a) of FIG. 19, the position and attitude of the assembly pallet 210 are accurately recognized after the rotation, thereby assembling the second component 213 in the first component 211.

Although the accuracy is sufficiently ensured only by fixing the LED board 2120 in the position of part (a) of FIG. 19, two LED boards 2120 may be provided in diagonal positions as illustrated in part (b) of FIG. 19 in order to further enhance the accuracy. As illustrated in part (c) of FIG. 19, four LEDs 2121 may respectively be provided in four corners of the assembly pallet while LED 2122 is provided in the center of the assembly pallet. In the configuration of part (c) of FIG. 19, the assembly pallet 210 can be miniaturized compared with the configurations of parts (a) and (b) of FIG. 19.

Finally a component assembling method according to a seventh exemplary embodiment of the invention will be described below. First an outline of an image forming apparatus predicated on the component assembling method of the seventh exemplary embodiment will be described.

Figure 20:
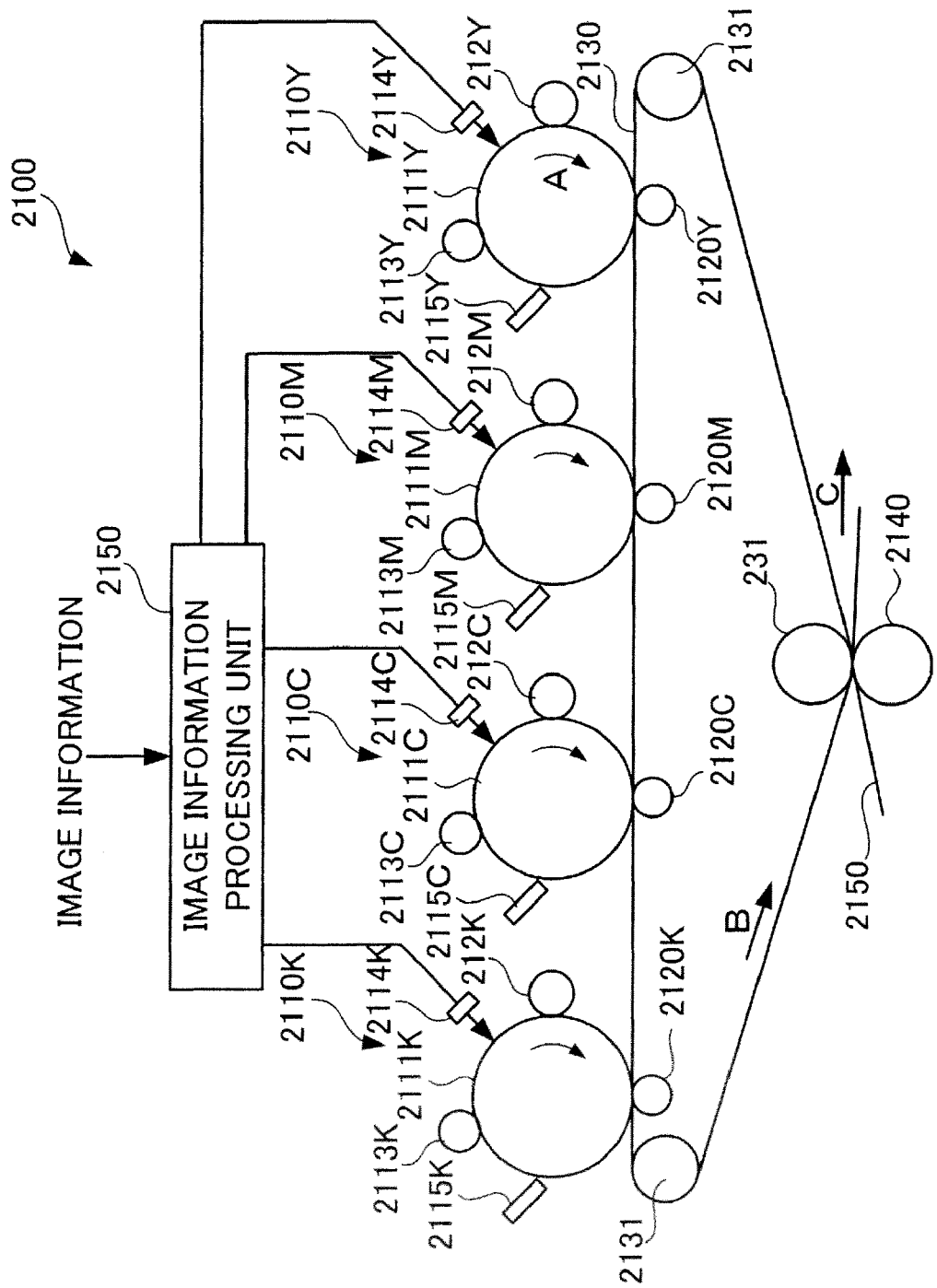
FIG. 20 is a schematic diagram illustrating a configuration of a main part in the image forming apparatus.

FIG. 20 is a schematic diagram illustrating a configuration of a main part in the image forming apparatus.

Referring to FIG. 20, an image forming apparatus 2100 includes four image forming portions 2110Y, 2110M, 2110C, and 2110K. The image forming portions 2110Y, 2110M, 2110C, and 2110K include photoreceptors 2111Y, 2111M, 2111C, and 2111K, charging devices 2113Y, 2113M, 2113C, and 2113K, exposure devices 2114Y, 2114M, 2114C, and 2114K, development rollers 2112Y, 2112M, 2112C, and 2112K, primary transfer rollers 2120Y, 2120M, 2120C, and 2120K, and cleaning members 2115Y, 2115M, 2115C, and 2115K, respectively. The photoreceptors 2111Y, 2111M, 2111C, and 2111K are rotated in the direction of the arrow A.

In the image forming apparatus 2100, full-color printing can be performed, and suffixes Y, M, C, K of the components designate components for forming yellow, magenta, cyan, and black images.

The image forming apparatus 2100 also includes an intermediate transfer belt 2130, a secondary transfer roller 2140, a tension roller 2131, and an image information processing unit 2150. The intermediate transfer belt 2130 is circulated in the direction of the arrow B. The image information processing unit 2150 transmits image information to each of the image forming portions 2110Y, 2110M, 2110C, and 2110K.

The image information processing unit 2150 separates the image information fed from the outside into yellow, magenta, cyan, and black pieces of image information, and the image information processing unit 2150 transmits the yellow, magenta, cyan, and black pieces of image information to the exposure devices 2114Y, 2114M, 2114C, and 2114K, respectively.

A basic image forming operation performed by the image forming apparatus 2100 will be described below.

In the image forming apparatus 2100, the yellow image forming portion 2110Y starts toner image formation, and the charging device 2113Y imparts predetermined charges to a surface of the photoreceptor 2111Y rotated in the direction of the arrow A. Then, in response to the image information transmitted from the image information processing unit 2150, the exposure device 2114Y irradiates the surface of the photoreceptor 2111Y with exposure light corresponding to the yellow image to form an electrostatic latent image. The development roller 2112Y develops the electrostatic latent image using yellow toner, thereby forming a yellow toner image on the photoreceptor 2111Y. The toner image is transferred to the intermediate transfer belt 2130 by the action of the primary transfer roller 2120Y.

At this point, a developer containing toner and magnetic carriers is used in the image forming apparatus 2100. In the developer, the magnetic carrier is coated with an external additive in order to secure a toner charging characteristic. The electrostatic latent image formed on the photoreceptor according to the image information is developed by the toner contained in the developer. After a developer cartridge filled with the developer is loaded in the image forming apparatus 2100, only the toner is refilled, and the toner and the magnetic carrier are mixed, whereby the toner is negatively charged while the external additive of the magnetic carrier is positively charged.

In the intermediate transfer belt 2130, the magenta image forming portion 2110M performs the toner image formation such that the magenta toner image that is of the next color reaches the primary transfer roller 2120M in synchronization with the time the yellow toner image transferred onto the intermediate transfer belt 2130 reaches the primary transfer roller 2120M of the next color image forming portion 2110M. The magenta toner image is transferred to the intermediate transfer belt 2130 by the action of the primary transfer roller 2120M while superimposed on the yellow toner image of the intermediate transfer belt 2130.

Then, the cyan and black image forming portions 2110C and 2110K perform the toner image formation in the similar timing, and the toner images are sequentially transferred to the intermediate transfer belt 2130 by the action of the primary transfer rollers 2120C and 2120 while superimposed on the yellow and magenta toner images of the intermediate transfer belt 2130.

The secondary transfer roller 2140 finally secondary-transfers the multicolor toner image transferred onto the intermediate transfer belt 2130 to a sheet 2150, and the multicolor toner image is conveyed in the direction of the arrow C along with the sheet 2150. Then a fixing device (not illustrated) fixes the multicolor toner image to the sheet 2150 to form the color image.

After the toner images are transferred to the intermediate transfer belt 2130, the cleaning members 2115Y, 2115M, 2115C, and 2115K scrape out the toner remaining on the photoreceptors 2111Y, 2111M, 2111C, and 2111K from the surfaces of the photoreceptors 2111Y, 2111M, 2111C, and 2111K. The waste toner scraped out by the cleaning member is conveyed in a direction perpendicular to the paper plane of FIG. 20 by a mechanism (not illustrated), and the waste toner is discharged to a waste toner receiving tank (not illustrated).

When the yellow image forming portion 2110Y is cited as an example, the photoreceptor 2111Y, the charging device 2113Y, and the cleaning member 2115Y are assembled into one photoreceptor assembly by the component assembling method of the invention, and disposed in the image forming apparatus 2100. The same holds true for other image forming portions.

The component assembling method of the seventh exemplary embodiment will be described by taking the photoreceptor assembly for example.

Figure 21:
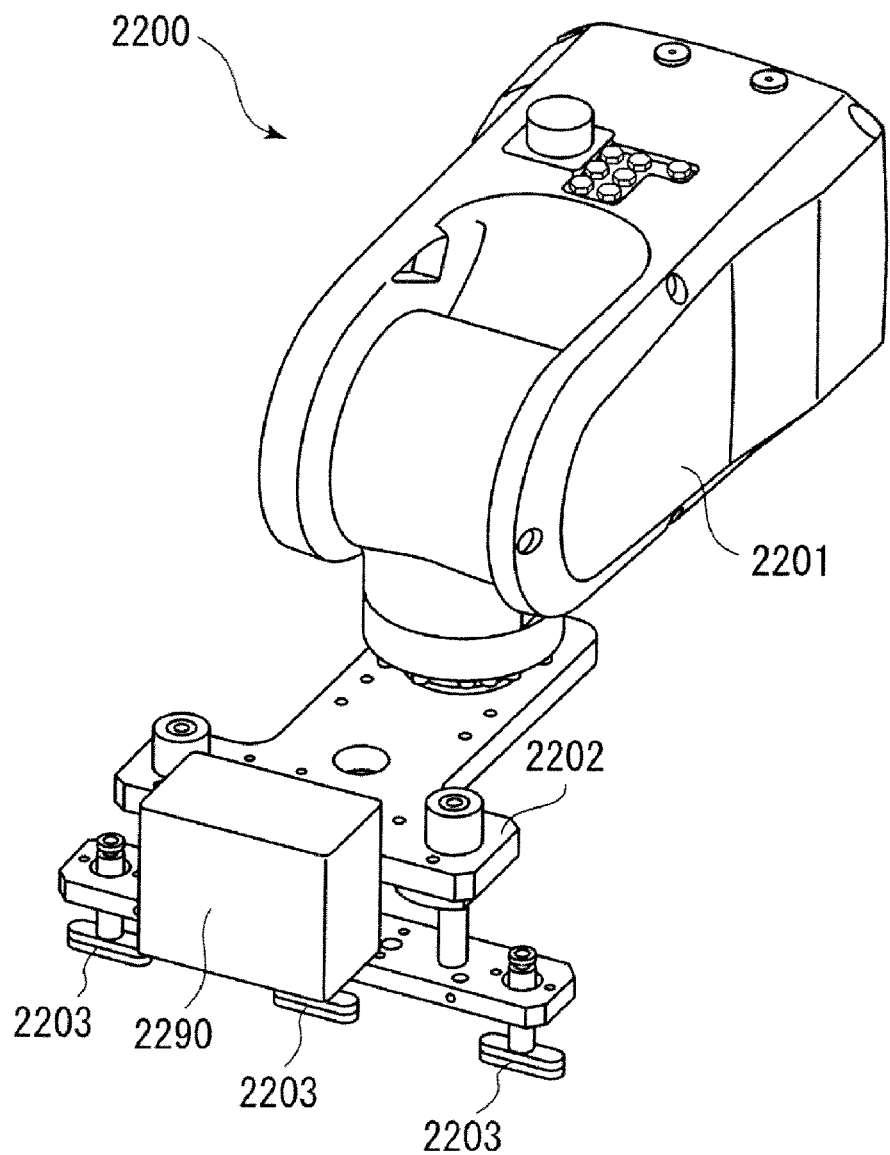
FIG. 21 is a perspective view illustrating a robot used to assemble a photoreceptor assembly.

FIG. 21 is a perspective view illustrating a robot used to assemble the photoreceptor assembly.

A robot arm 2201 and a robot hand 2202, which constitute a robot 2200, are illustrated in FIG. 21. The robot hand 2202 includes suction pads 2203 that suck (an example of "grasp" of the invention) and lift the component by evacuation. A measuring camera 2290 is fixed to the robot hand 2202. The position and attitude are freely changed in the robot hand 2202.

Figure 22:
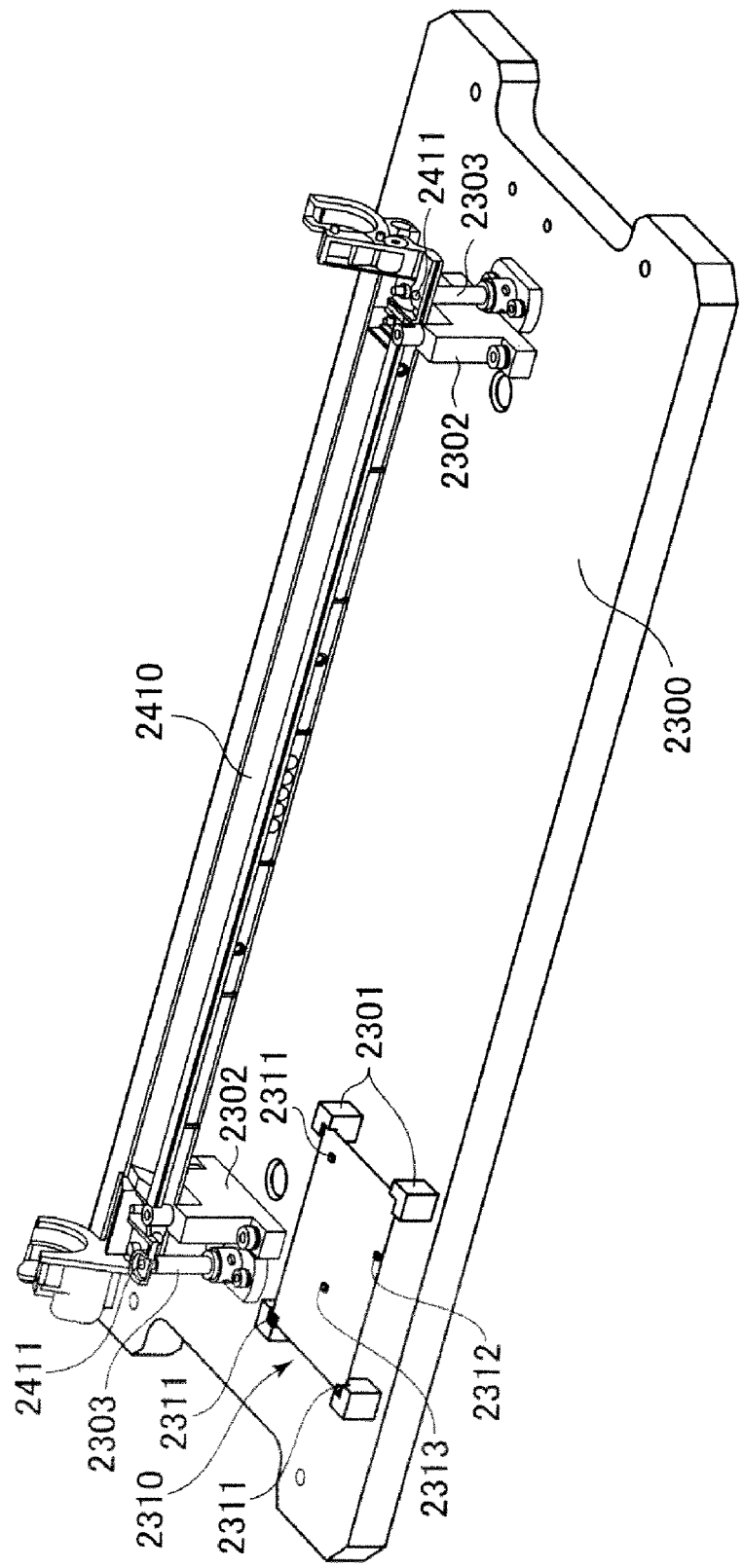
FIG. 22 is a perspective view illustrating an assembly pallet and a frame made of a resin supported by the assembly pallet.

FIG. 22 is a perspective view illustrating an assembly pallet 2300 and a frame 2410 supported by the assembly pallet 2300. The frame 2410 is a resin component. The frame 2410 is a frame of the photoreceptor assembly, and the frame 2410 is one of the components constituting the photoreceptor assembly.

Four retaining pieces 2301 are fixed onto the assembly pallet 2300, and an LED board 2310 is fixed to the assembly pallet 2300 by the retaining pieces 2301. Three measuring LEDs 2311, LED 2312, and LED 2313 are provided on the LED board 2310. LED 2312 is used as ID for distinguishing the LED board 2310 from other LED boards. LED 2313 is fixed slightly above the LED board 2310. Three LEDs 2311 and one LED 2313 are used to measure the position and attitude of the LED board 2310. The arrangement position of one LED 2312 depends on the LED board 2310, and the arrangement position is specified to distinguish the LED board 2310 from other LED boards. Because the method of obtaining the position and attitude of the LED board 2310 using LEDs 2311 and 2313 on the LED board 2310 is similar to that of FIG. 14, the detailed description is omitted.

Referring to FIG. 22, two retaining pieces 2302 and two positioning pins 2303 are provided in the assembly pallet 230. The two retaining pieces 2302 are used to retain the frame 2410, and the two positioning pins 2303 are used to position the frame 2410 on the assembly pallet 2300. Two positioning holes 2411 are made in the frame 2410, and the positioning pins 2303 are inserted in the positioning holes 2411 while the frame 2410 is mounted on the retaining piece 2302, thereby previously disposing the frame 2410 in a predetermined position of the assembly pallet 2300.

The LED board 2310 and the frame 2410 are disposed in the predetermined positions on the assembly pallet 2300, and the position and attitude of the frame 2410 are unambiguously obtained by obtaining the position and attitude of the LED board 2300.

Figure 23:
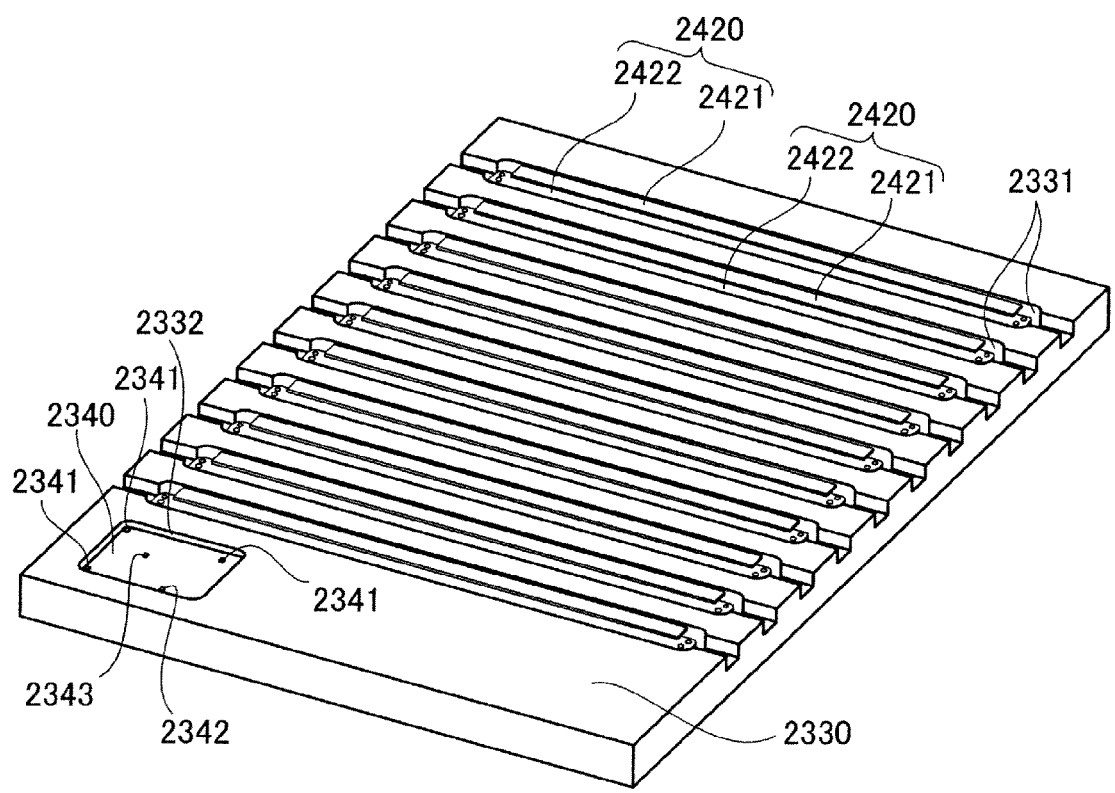
FIG. 23 is a perspective view illustrating an alignment tray and cleaning members arranged on the alignment tray.

FIG. 23 is a perspective view illustrating an alignment tray and cleaning members arranged on the alignment tray.

Ten cleaning members 2420 are arranged in an alignment tray 2330 of FIG. 23. The cleaning members 2420 correspond to the cleaning members 2115Y, 2115M, 2115C, and 2115K of FIG. 20, respectively. The cleaning member 2420 of FIG. 23 is a composite component including a rubber component 2421 and a sheet-metal component 2422. The rubber component 2421 is in direct contact with the photoreceptor. The rubber component 2421 is supported by the sheet-metal component 2422.

The alignment tray 2330 includes ten storage grooves 2331, and each of the cleaning members 2420 is stored in each of the storage grooves 2331. Therefore, the cleaning member 2420 is maintained in predetermined position and attitude on the alignment tray 2330.

A recess 2332 is provided in the alignment tray 2330, and the LED board 2340 is fitted in the recess 2332. The LED board 2340 is fitted in the recess 2332 to fix the LED board 2340 in predetermined position and attitude.

The LED board 2340 includes three LEDs 2341 and one LED 2343, and the positions of three LEDs 2341 and one LED 2343 are identical to those of LED board 2310 of FIG. 22. LED 2342 differs from LED 2312 on the LED board 2310 of FIG. 22 in the arrangement position. This is because the arrangement position is varied for each LED board to use LED 2342 as ID for specifying the LED board.

For the LED board 2340 of FIG. 23, the position and attitude of the LED board 2310 are recognized by the measurement of a camera 2290, and the position and attitude of each of the cleaning members 2420 arranged on the alignment tray 2330 are obtained based on the position and attitude of the LED board 2310. The robot 2200 of FIG. 21 extracts one of the cleaning members 2420 arranged on the alignment tray 2330 to assemble the cleaning member 2420 in the frame 2410 of FIG. 22.

A procedure of assembling the cleaning member 2420 in the frame 2410 will be described below.

Figure 24:
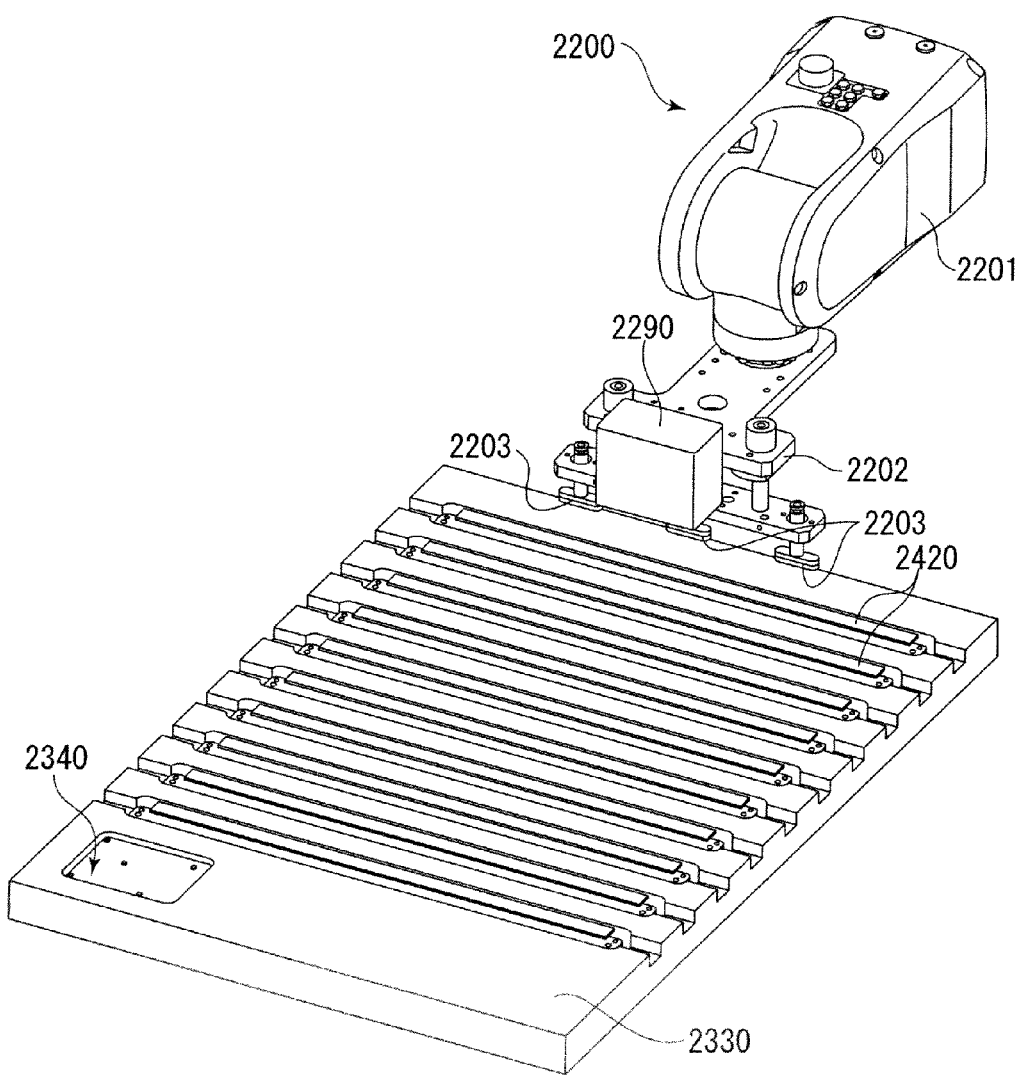
FIG. 24 is a perspective view illustrating a state in which the robot comes close to the alignment tray before the cleaning member is extracted.

FIG. 24 is a perspective view illustrating a state in which the robot 2200 comes close to the alignment tray 2330 before the cleaning member 2420 is extracted.

Then, the camera 2290 measures the position and attitude of the LED board 2340, thereby the position and attitude of the cleaning member 2420 are recognized, and the suction pad 2221 of the robot hand 2220 are controlled in the position and attitude so as to face the cleaning member 2420 to be extracted.

Figure 25:
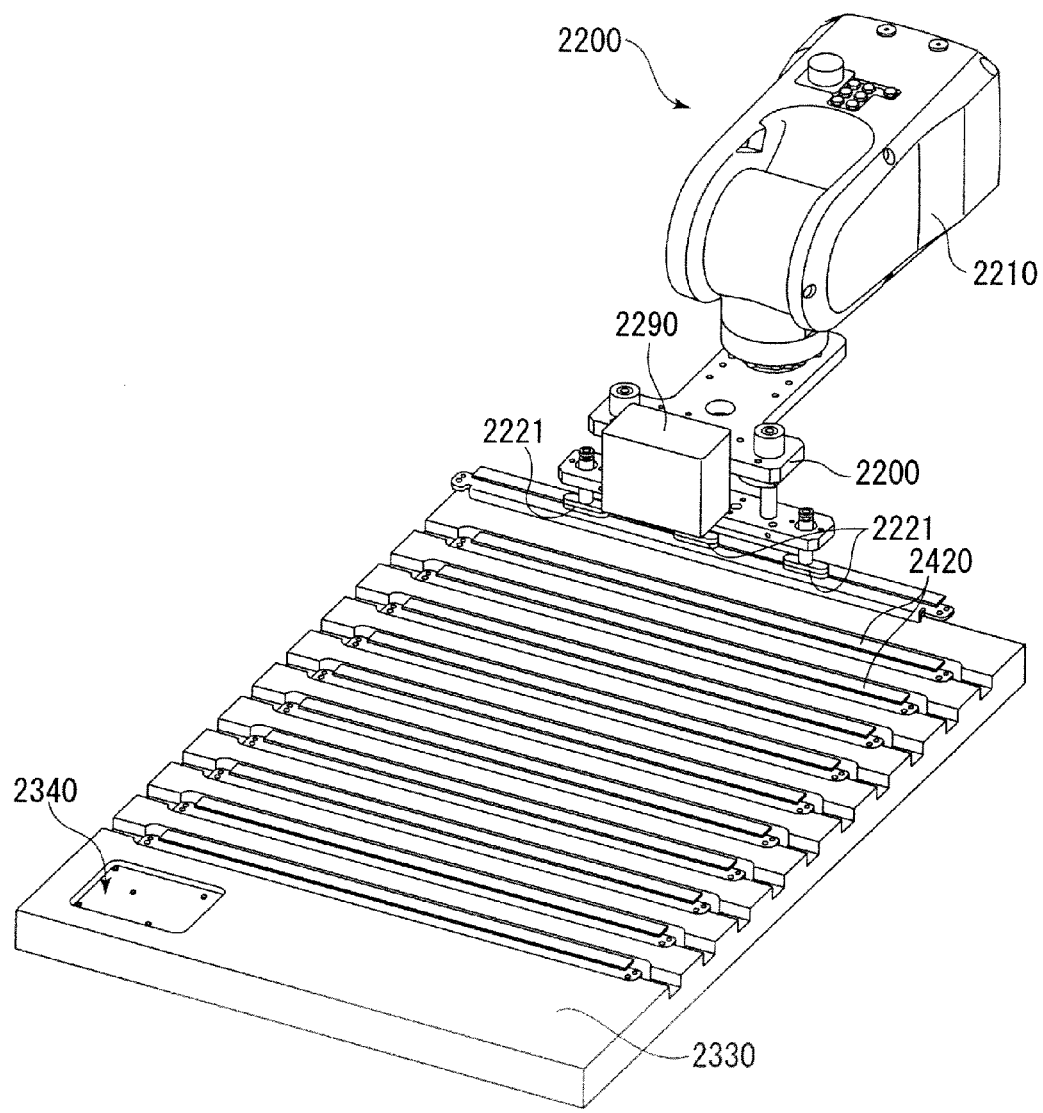
FIG. 25 is a perspective view illustrating a state in which the robot extracts one of the cleaning members on the alignment tray.

FIG. 25 is a perspective view illustrating a state in which the robot 2200 extracts one of the cleaning members 2420 on the alignment tray 2330.

The suction pad 2203 of the robot 2200 faces the cleaning member 2420 to be extracted on the alignment tray 2330, the suction pad 2203 is pressed against the cleaning member 2420 to suck the cleaning member 2420 by evacuation, and the cleaning member 2420 is directly lifted, thereby extracting the cleaning member 2420 from the alignment tray 2330.

Figure 26:
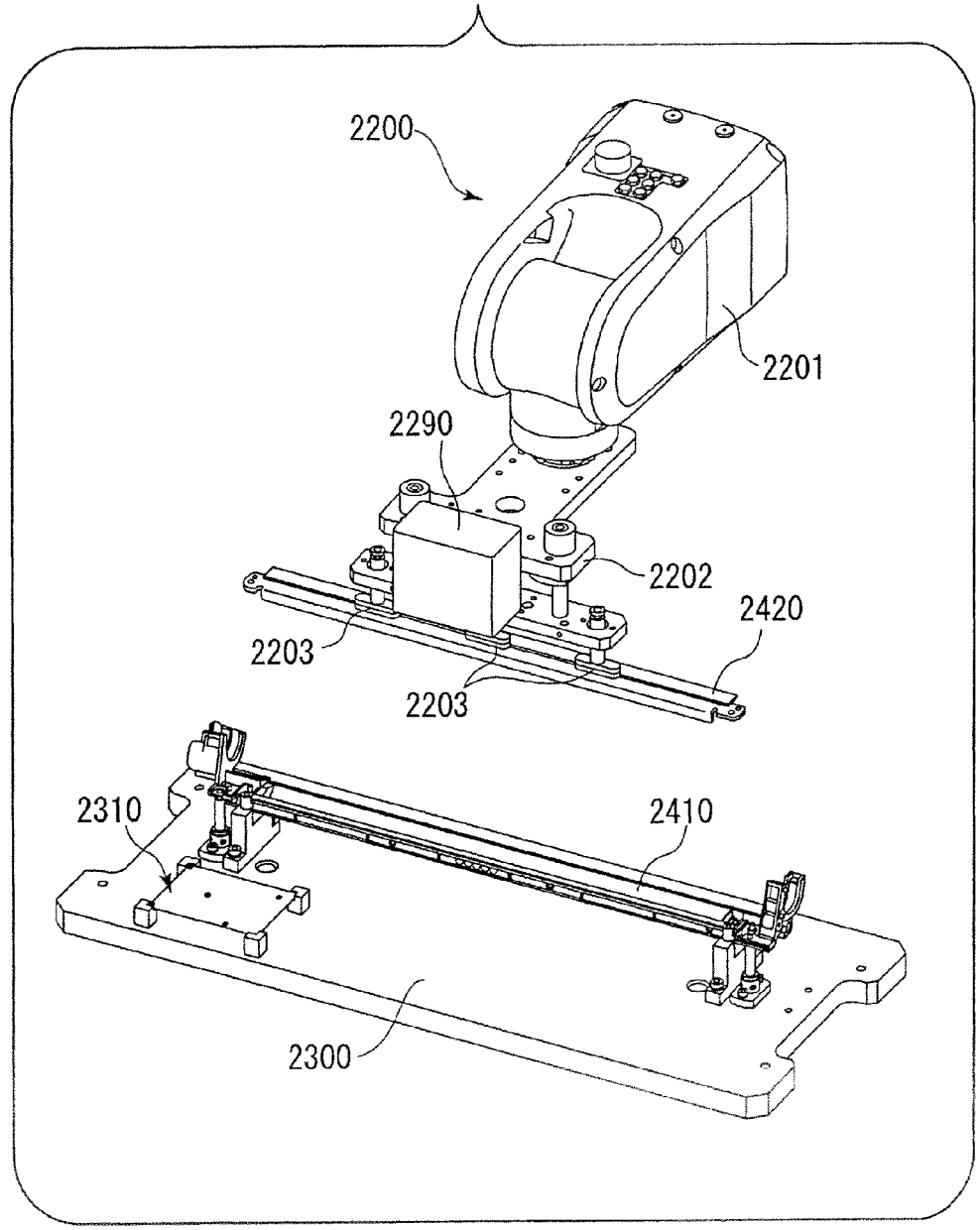
FIG. 26 is a perspective view illustrating a state in which the robot sucking the cleaning member comes close to the assembly pallet.

FIG. 26 is a perspective view illustrating a state in which the robot sucking the cleaning member comes close to the assembly pallet.

When the robot 2200 comes close to the assembly pallet 2330, the camera 2290 attached to the robot 2200 measures the position and attitude of the LED board 2310, thereby the position and attitude of the frame 2410 are recognized. Then the robot 2200 is moved such that the cleaning member 2420 sucked by the suction pad 2203 of the robot hand 2202 faces the frame 2410 fixed to the assembly pallet 2300.

Figure 27:
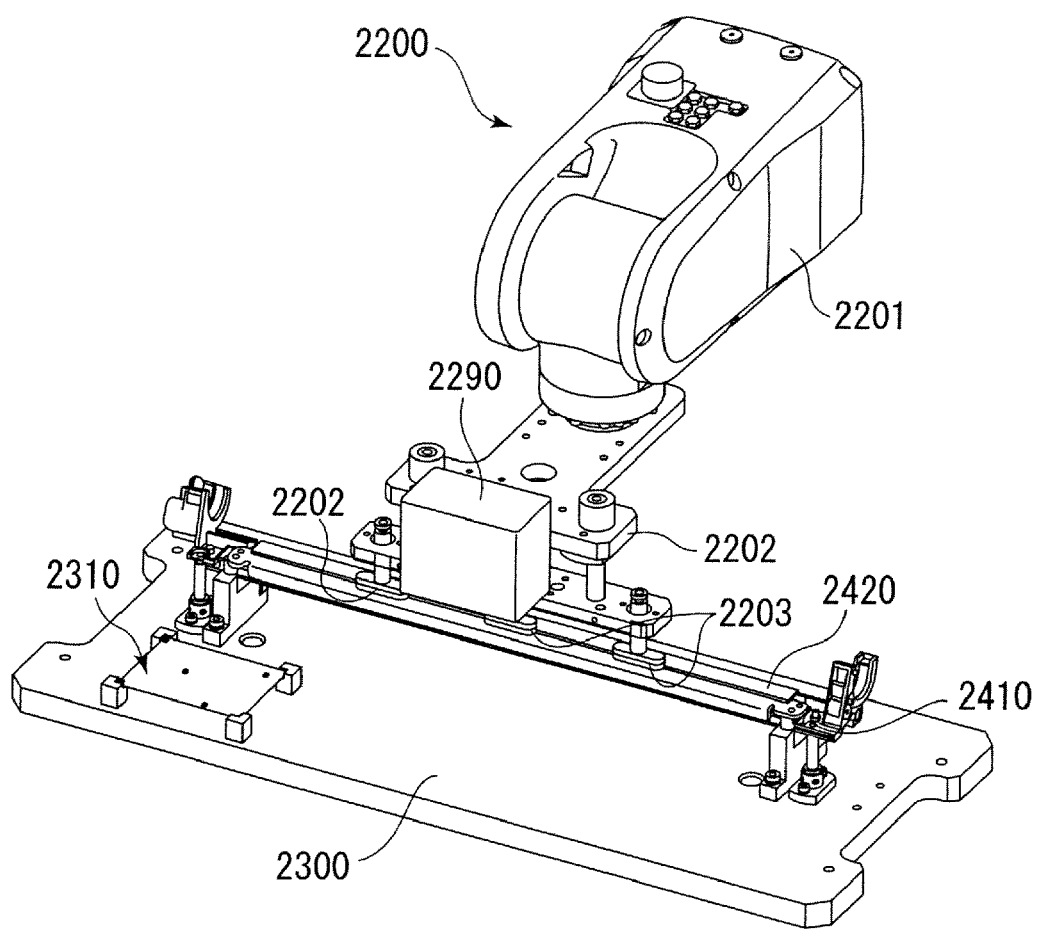
FIG. 27 is a perspective view illustrating a state in which the cleaning member has been assembled in the frame.

FIG. 27 is a perspective view illustrating a state in which the cleaning member 2420 is assembled in the frame 2410.

After the cleaning member 2420 faces the frame 2410, the cleaning member 2420 is assembled in the frame 2410 as illustrated in FIG. 27. Then, the suction of the suction pad 2203 is released, and the robot 2200 is raised to separate the suction pad 2203 from the cleaning member 2420.

After the cleaning member 2420 is assembled in the frame 2410, various members are sequentially assembled in the assembling manner similar to that of the cleaning member 2420.

Figure 28:
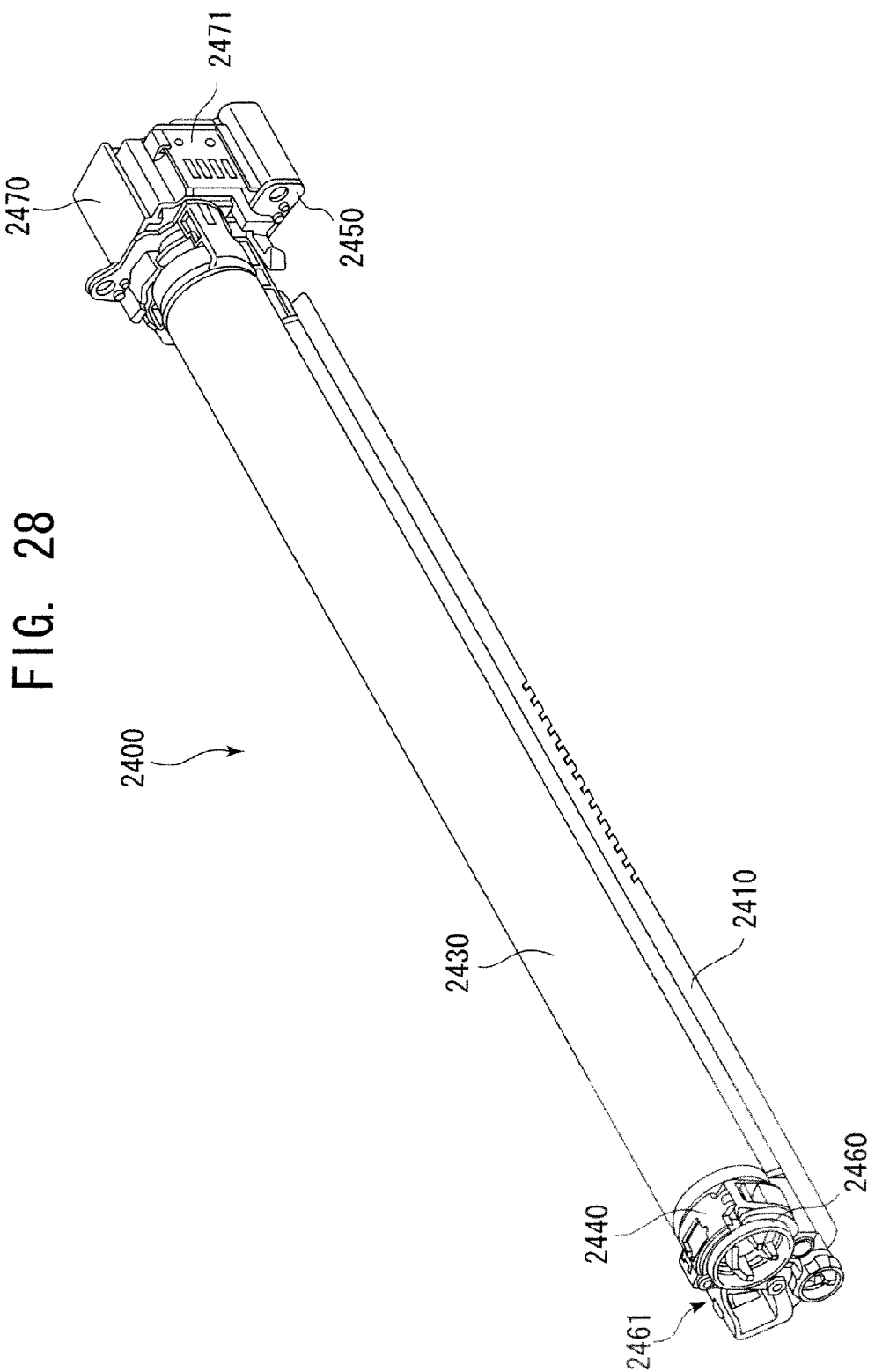
FIGS. 28 and 29 are perspective views illustrating the photoreceptor assembly after the assembly when the photoreceptor assembly is viewed from different angles.
Figure 29:
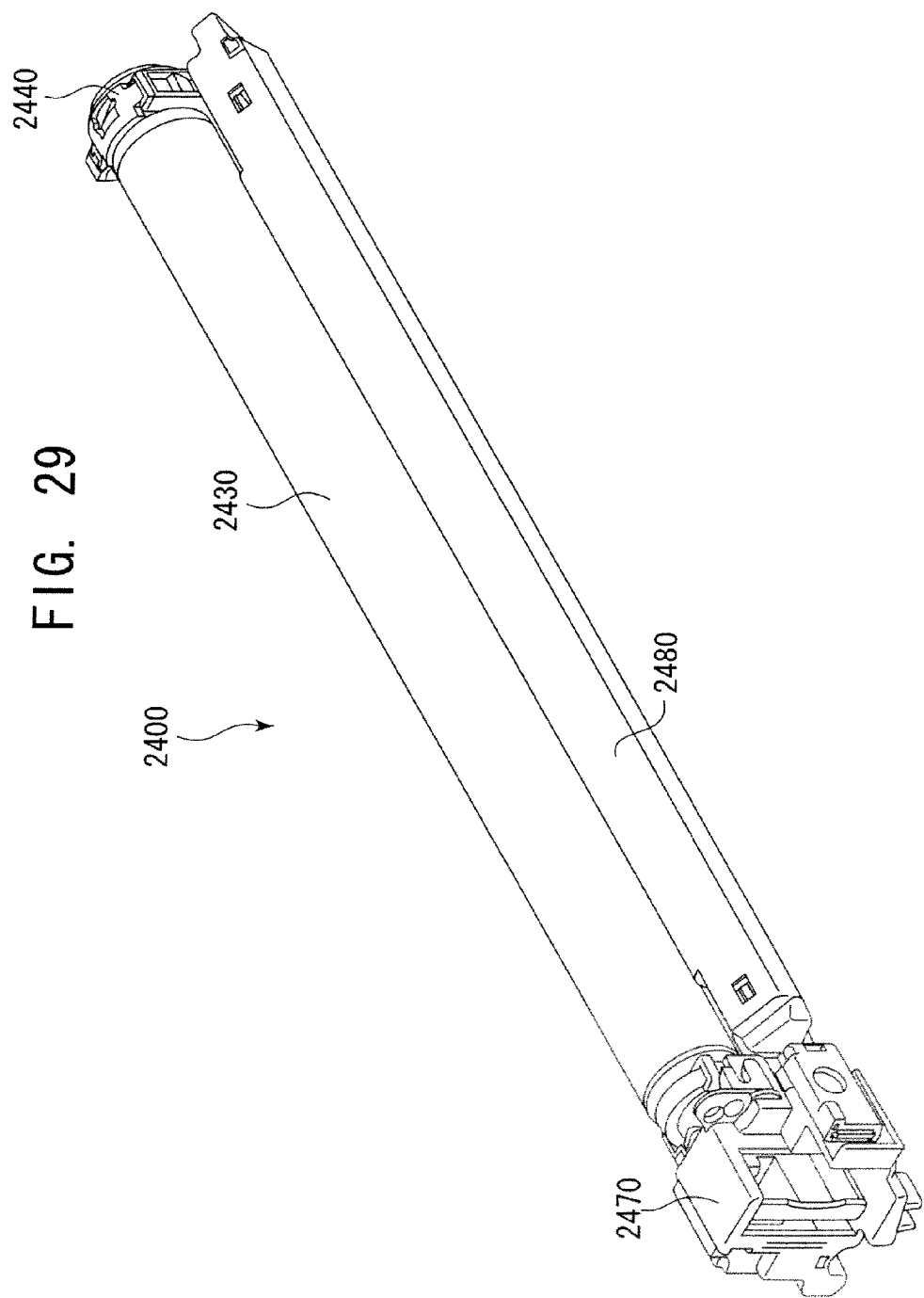

FIGS. 28 and 29 are perspective views illustrating the photoreceptor assembly after the assembly when the photoreceptor assembly is viewed from different angles.

Referring to FIGS. 28 and 29, a photoreceptor assembly 2400 includes the frame member 2410, a photoreceptor 2430, a photoreceptor retaining member 2440, a support plate 2450, a rear cover 2460, a front cover 2470, and a charging device 2480. The photoreceptor 2430 corresponds to one of the photoreceptors 2111Y, 2111M, 2111C, and 2111K of FIG. 20, and the charging device 2480 corresponds to one of the charging devices 2113Y, 2113M, 2113C, and 2113K of FIG. 20.

The cleaning member 2420 (for example, see FIG. 25) initially assembled in the frame 2410 is not illustrated in FIGS. 28 and 29 because the cleaning member 2420 is covered with the photoreceptor 2430.

The photoreceptor retaining member 2440 and the support plate 2450 support a rear end and a front end of the photoreceptor 2430, respectively. A rear part and a front part of the photoreceptor assembly 2400 are covered with the rear cover 2460 and the front cover 2470, respectively. However, an opening 2461 is formed in the rear cover 2450 in order to transmit a torque to the photoreceptor 2430. A board 2471 is fixed to the front cover 2470, and a storage unit in which the cumulative number of rotations of the photoreceptor 2430 is recorded is mounted on the board 2471.

A procedure of assembling the components constituting the photoreceptor assembly 2400 will be described below.

Figure 30:
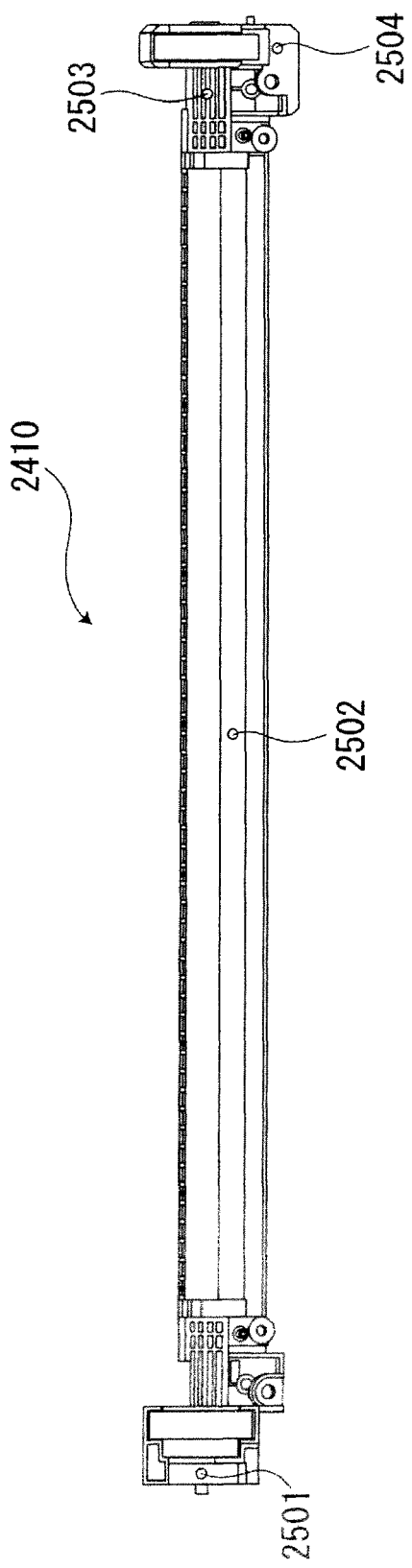
FIG. 30 illustrates the frame.

FIG. 30 illustrates the frame 2410.

Although not illustrated in the above drawings because of unnecessity, a marker is added in the following drawings in order to identify an assembly stage, as described below. Desirably, the images of the markers such as LED and the retroreflector are clearly taken with the camera 2290 (see FIG. 21).

A support plate identifying marker 2501, a cleaning member identifying marker 2502, a photoreceptor identifying marker 2503, and a charging device identifying marker 2504 are formed in the frame 2410 of FIG. 30.

Figure 31:
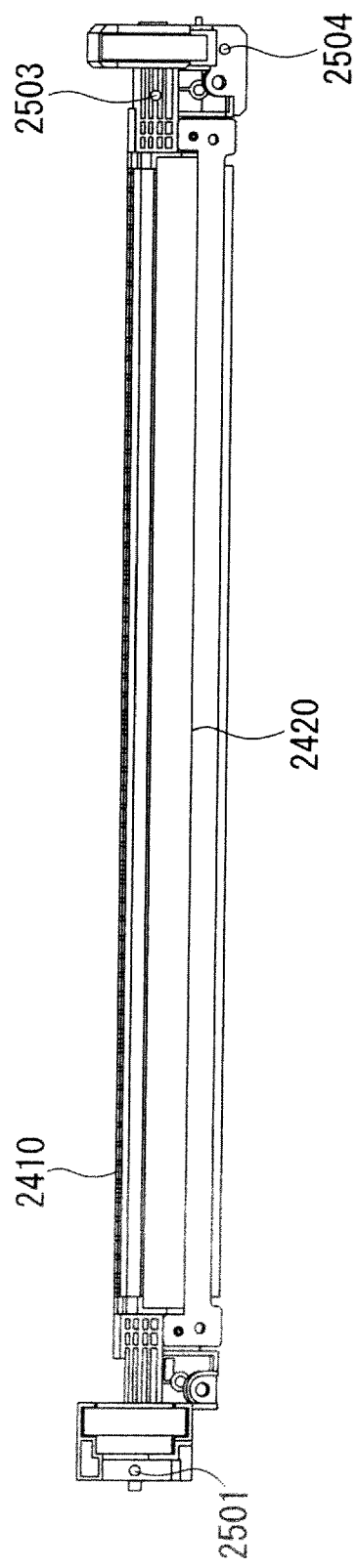
FIG. 31 illustrates a state in which the cleaning member has been assembled in the frame.

FIG. 31 illustrates a state in which the cleaning member 2420 is assembled in the frame 2410.

Referring to FIG. 31, the cleaning member identifying marker 2502 (see FIG. 30) is covered with the cleaning member 2420 by assembling the cleaning member 2420 in the frame 2410, and the camera 2290 or a worker easily recognizes that the cleaning member 2420 is assembled in the frame 2410.

Figure 32:
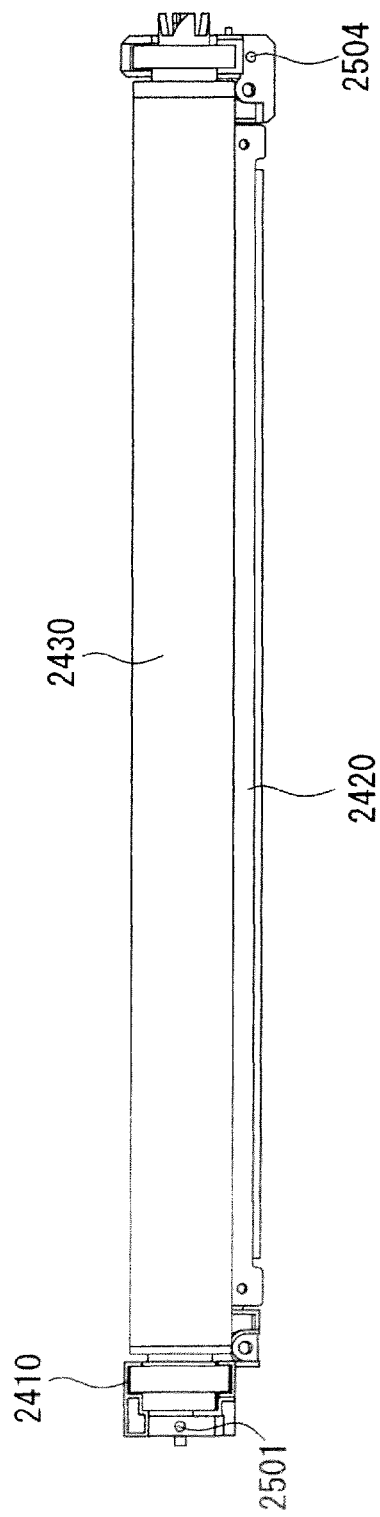
FIG. 32 illustrates a state in which the photoreceptor assembly has been assembled.

FIG. 32 illustrates a state in which the photoreceptor 2430 is assembled.

The photoreceptor identifying marker 2503 which is seen until then (see FIG. 31) is covered by assembling the photoreceptor 2430. Therefore, the camera 2290 or the worker easily recognizes that the photoreceptor 2430 is assembled.

Figure 33:
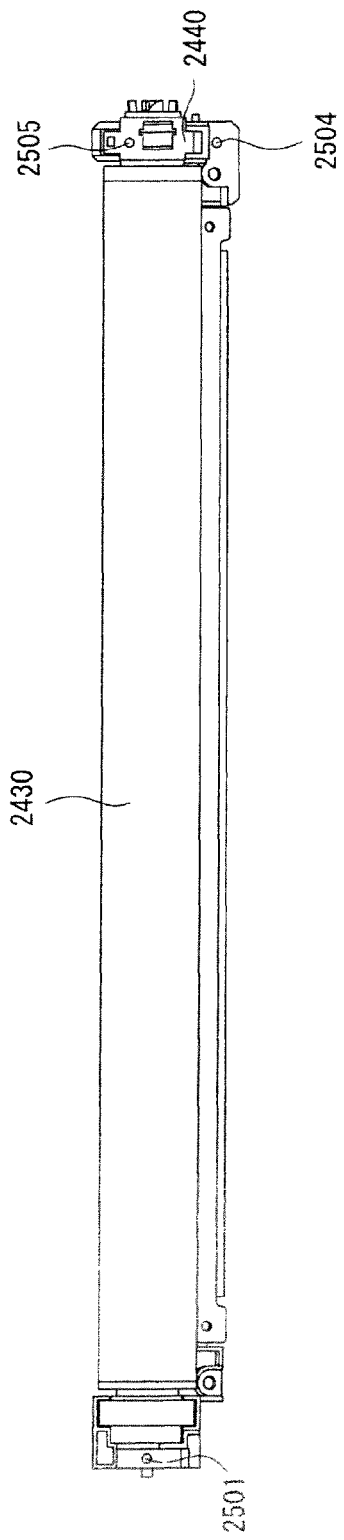
FIG. 33 illustrates a state in which a photoreceptor assembly retaining member is further assembled.
Figure 34:
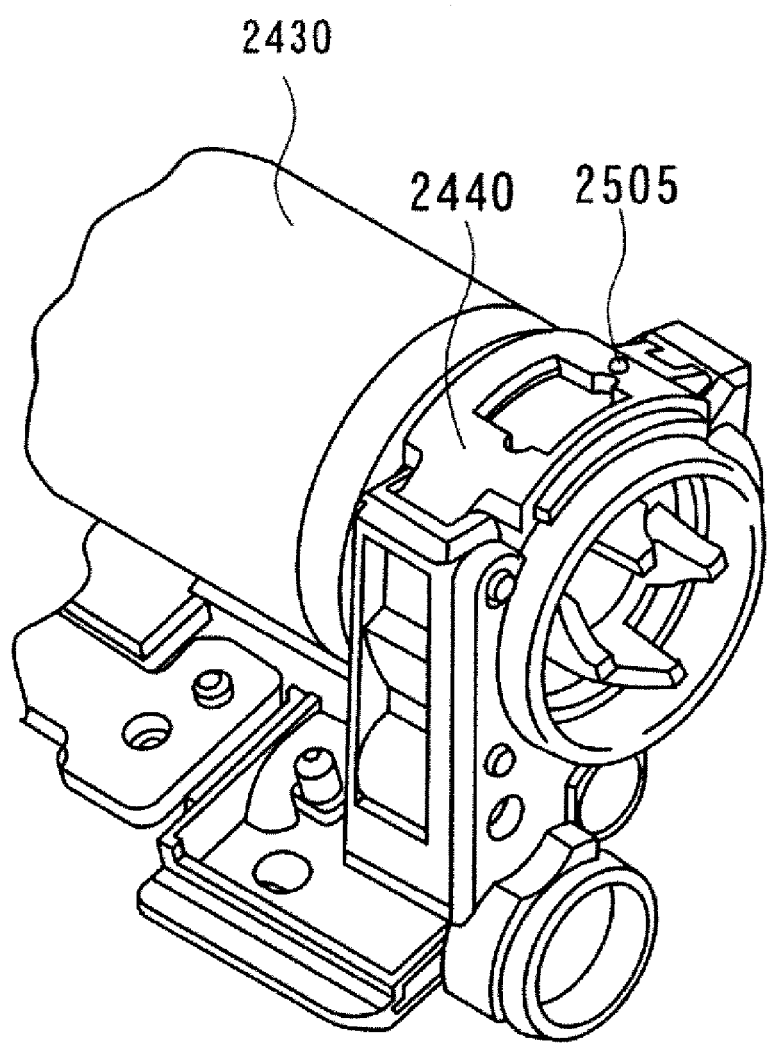
FIG. 34 is a partially enlarged perspective view illustrating the state of FIG. 33.

FIG. 33 illustrates a state in which the photoreceptor retaining member 2440 is further assembled, and FIG. 34 is a partially enlarged perspective view illustrating the state of FIG. 33.

A new photoreceptor retaining member identifying marker 2505 is added to the photoreceptor retaining member 2440, and the camera 2290 or the worker easily recognizes that the photoreceptor retaining member identifying marker 2505 is newly added in addition to the support plate identifying marker 2501 and the exposure device identifying marker 2504. Therefore, the camera 2290 or the worker recognizes that the photoreceptor retaining member 2440 is assembled.

Figure 35:
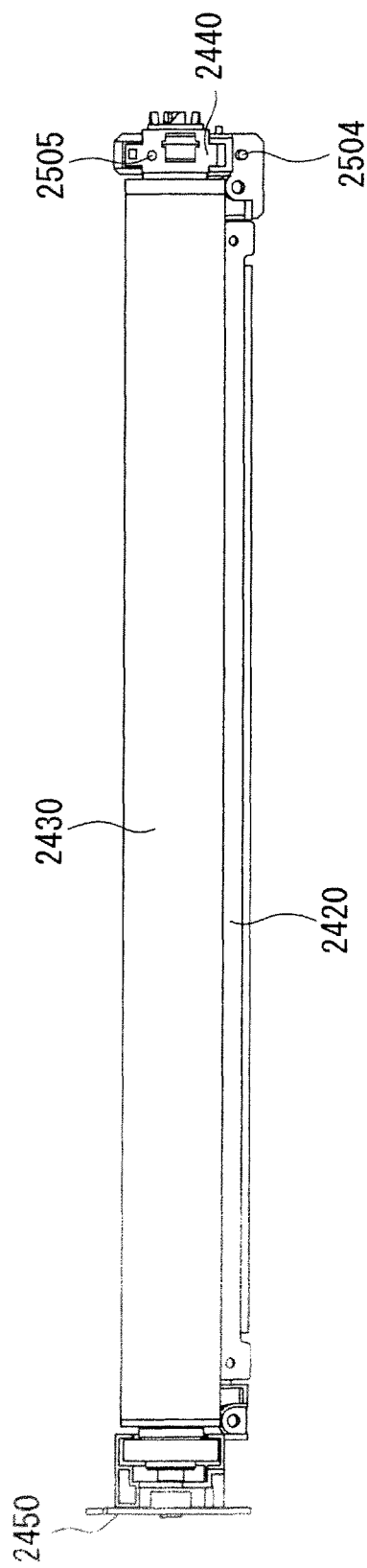
FIG. 35 illustrates a state in which the support plate has been further assembled.
Figure 36:
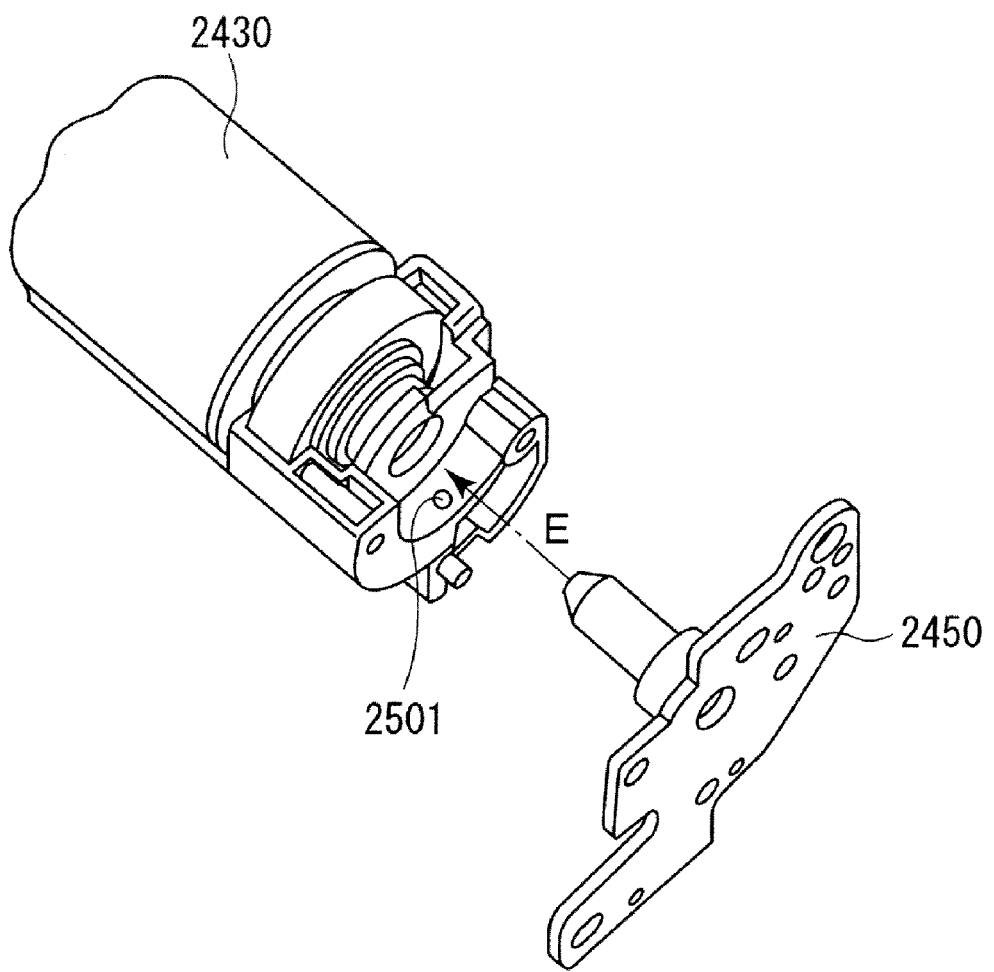
FIG. 36 is a partially enlarged perspective view illustrating a state immediately before the support plate is assembled.

FIG. 35 illustrates a state in which the support plate 2450 is further assembled, and FIG. 36 is a partially enlarged perspective view illustrating a state immediately before the support plate 2450 is assembled.

As illustrated in FIG. 36, the support plate 2450 is assembled so as to be inserted in the direction of the arrow E from the front end of the photoreceptor 2430. Although the support plate identifying marker 2501 is seen before the support plate 2450 is assembled, the support plate identifying marker 2501 is covered by assembling the support plate 2450. Because the camera 2290 or the worker recognizes that the support plate identifying marker 2501 is covered, the camera 2290 or the worker recognizes that the support plate 2450 is assembled.

Figure 37:
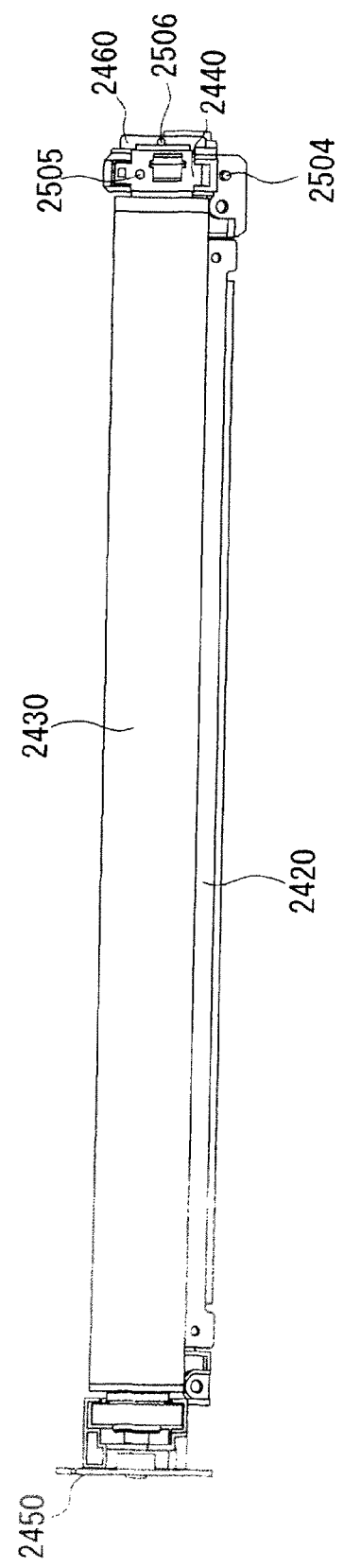
FIG. 37 illustrates a state in which a rear cover has been further assembled.
Figure 38:
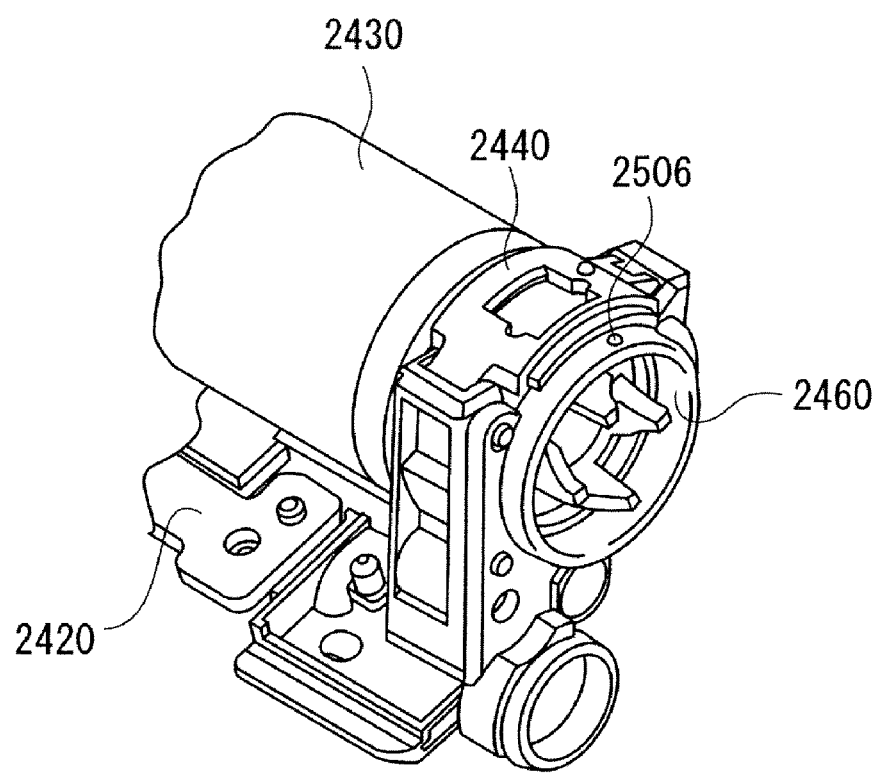
FIG. 38 is a partially enlarged perspective view illustrating the state of FIG. 37.

FIG. 37 illustrates a state in which the rear cover 2460 is further assembled, and FIG. 38 is a partially enlarged perspective view illustrating the state of FIG. 37.

A new rear cover identifying marker 2506 is added to the rear cover 2460, and the camera 2290 or the worker recognizes that the rear cover identifying marker 2506 is added. Therefore, the camera 2290 or the worker easily recognizes that the rear cover 2460 is assembled.

Figure 39:
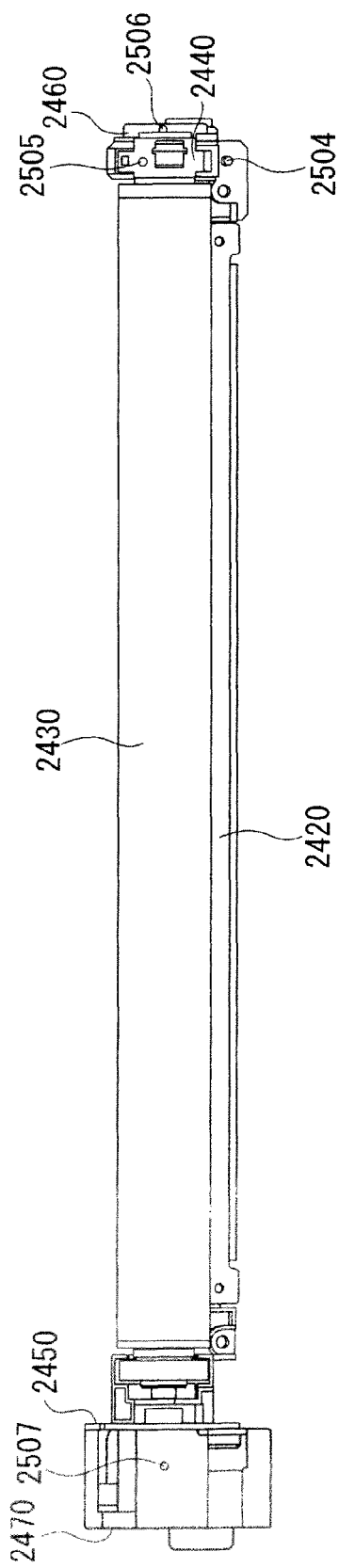
FIG. 39 illustrates a state in which a front cover has been further assembled.
Figure 40:
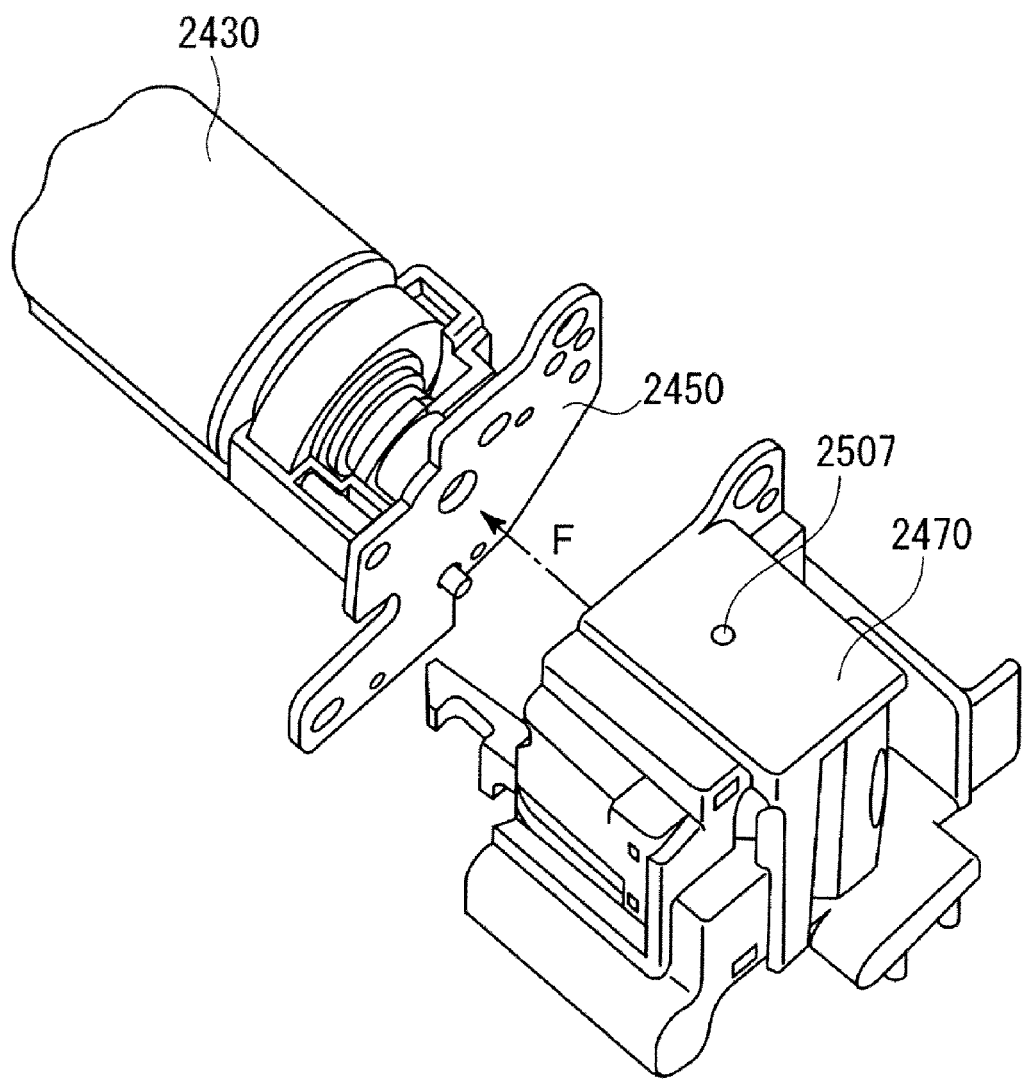
FIG. 40 is a partially enlarged perspective view illustrating a state immediately before the front cover is assembled.

FIG. 39 illustrates a state in which the front cover 2470 is further assembled, and FIG. 40 is a partially enlarged perspective view illustrating a state immediately before the front cover 2470 is assembled.

As illustrated in FIG. 40, the front cover 2470 is assembled in the support plate 2450 so as to be pressed against the support plate 2450 in the direction of the arrow F from the front side.

A new front cover identifying marker 2507 is added to the front cover 2470. Because the new front cover identifying marker 2507 is added to the front cover 2470, the camera 2290 or the worker easily recognizes that the front cover 2470 is added.

FIG. 41 illustrates a state in which the charging device 2480 is further assembled.

When the charging device 2480 is assembled, the charging device identifying marker 2504 is covered with the charging device 2480. Therefore, the camera 2290 or the worker easily recognizes in one glance that the charging device 2480 is assembled.

As described above, according to the assembly stage of each component constituting the photoreceptor assembly, the marker is formed such that a pattern in which the marker appears is changed, so that the camera or the worker easily recognizes the assembly stage at a glance.

As used herein, the term of "grasp" shall mean not only that the component is mechanically sandwiched, but also the component is lifted by vacuum suction of the component, magnetic attraction of the component with an electromagnet, and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

What is claimed is:

1. A component extracting method comprising:
    recognizing a position and an attitude of a measured object by taking an image of a light spot group of the measured object with a camera, the measured object and a component of an extracting target being supported in predetermined positions of a component support, the measured object having the light spot group including a plurality of light spots, serving as a measurement target of a position and an attitude, based on a light image expressing light spots constituting the light spot group on an image taken with the camera; computing a position and an attitude of the component based on the position and the attitude of the measured object recognized in the recognizing as well as geometric arrangement positions of the measured object supported by the component support and the component; and
    manipulating a robot to extract the component from the component support by positioning the robot to face and grasp the component of which position and attitude are computed in the computing, the robot being used to grasp the component.

2. The component extracting method according to claim 1, wherein the component support supports the measured object and a plurality of components in predetermined positions, the computing is a process in which a position and an attitude of each of the plurality of components are computed, and the extracting is a process in which the robot is positioned to sequentially face the respective components of which positions and attitudes are computed in the computing, to cause the robot to extract the respective components sequentially.

3. The component extracting method according to claim 2, further comprising determining whether the component support becomes an empty state in which all the components are extracted from the component support, by using a robot to count the number of components extracted from the component support.

4. The component extracting method according to claim 2, wherein the component support has light spots at positions where the plurality of components are supported, the light spots being obstructed by the existence of the component and appearing by the extraction of the component, and the component extracting method further comprises determining, by taking an image of the light spots of the component support with a camera, that the component support becomes an empty state in which all the components are extracted from the component support, when images of the light spots at all the positions where the components are supported by the component support are taken with the camera.

5. The component extracting method according to claim 1, wherein the component supports which support the measured object and the components are stacked in a plurality of stages, the component extracting method extracts a component supported by the component support stacked in the uppermost stage, and the component extracting method further comprises taking a component support out of the uppermost stage, by causing the robot to face the uppermost component support in which extraction of components is completed and to grasp and take out the component support from the uppermost stage.

6. The component extracting method according to claim 1, wherein the measured object has a light spot group including three light spots and one light spot, the three light spots being disposed while spaced apart from one another, the one light spot being disposed while perpendicularly spaced apart from a triangular reference plane, the triangular reference plane having vertexes of the three light spots, and the recognizing further comprising taking an image of the light spot group on the measured object with the camera, the camera being placed in a position spaced apart from a perpendicular to the reference plane.

7. A component assembling method comprising:
taking an image of a light spot group of a measured object with a camera, the measured object and a first component being supported in predetermined positions of an assembly pallet, the measured object having the light spot group including a plurality of light spots and serving as a measurement target of a position and an attitude;
recognizing a position and an attitude of the measured object based on a light image expressing the light spots constituting the light spot group on the image taken with the camera;
computing a position and an attitude of the first component based on the position and the attitude of the measured object and geometric arrangement positions of the measured object and the first component, the position and the attitude of the measured object recognized in the recognizing, the measured object and the first component being supported by the assembly pallet; and
assembling a component by causing a robot to grasp a second component and assemble the second component in the first component, by making the second component face the first component based on the position and the attitude of the measured object recognized in the recognizing.

8. The component assembling method according to claim 7, wherein the measured object has a light spot group including three light spots and one light spot, the three light spots being disposed while spaced apart from one another, the one light spot being disposed while perpendicularly spaced apart from a triangular reference plane, the triangular reference plane having vertexes of the three light spots, and the taking an image is a process including taking an image of the light spot group on the measured object with the camera, the camera being placed in a position in which an imaging optical axis is not matched with a perpendicular to the reference plane, the perpendicular passing through the one light spot.

9. The component assembling method according to claim 7, wherein the assembling is a process in which a component group in which the second component has been assembled in the first component supported by the assembly pallet is set as a new first component, a component to be assembled in the new first component is set as a new second component, and component assembly is repeated a plurality of times.

10. A component manipulating apparatus comprising:
a camera;
an image-taking control unit that causes the camera to take an image of a light spot group of a measured object, the measured object and a component of a manipulating target being supported in predetermined positions of a component support, the measured object having the light spot group including a plurality of light spots, the measured object serving as a measurement target of a position and an attitude;
a recognizing unit that recognizes a position and an attitude of the measured object based on a light image expressing the light spots constituting the light spot group on the image taken with the camera;
a computing unit that computes a position and an attitude of the component based on the position and the attitude of the measured object and geometric arrangement positions of the measured object and the component, the position and the attitude of the measured object recognized by the recognizing unit, the measured object and the component being supported by the component support;
a robot that manipulates the component; and
a control unit that causes the robot to manipulate the component based on the position and the attitude computed in the computing unit.

11. A component extracting apparatus comprising:
a camera;
an image-taking control unit that causes the camera to take an image of a light spot group of a measured object, the measured object and a component of an extracting target being supported in predetermined positions of a component support, the measured object having the light spot group including a plurality of light spots, the measured object serving as a measurement target of a position and an attitude;
a recognizing unit that recognizes a position and an attitude of the measured object based on a light image expressing the light spots constituting the light spot group on the image taken with the camera;
a computing unit that computes a position and an attitude of the component based on the position and the attitude of the measured object and geometric arrangement positions of the measured object and the component, the position and the attitude of the measured object recognized by the recognizing unit, the measured object and the component being supported by the component support;
a robot that grasps the component; and
a component extract control unit that causes the robot to face the component whose position and attitude have been computed in the computing unit and causes the robot to grasp the component to extract the component from the component support.

12. The component extracting apparatus according to claim 11, wherein the component support supports the measured object and the plurality of components in predetermined positions, the computing unit computes the position and the attitude of each of the plurality of components, and the component extract control unit causes the robot to sequentially face the components whose positions and attitudes have been computed in the computing and causes the robot to sequentially extract the components.

13. The component extracting apparatus according to claim 12, further comprising an empty determination unit that counts the number of components extracted from the component support by the robot to determine whether the component support becomes an empty state in which all the components are extracted from the component support.

14. The component extracting apparatus according to claim 12, wherein the component support has light spots at positions where the plurality of components are supported, the light spot being obstructed by the existence of the component and appearing by the extraction of the component, and the component extracting apparatus further comprises an empty determination unit that determines whether the component support becomes an empty state in which all the components are extracted from the component support, when the images of the light spots at all the positions in which the components are supported by the component support are taken with the camera.

15. The component extracting apparatus according to claim 11, wherein the component supports which support the measured objects and the components are stacked in a plurality of stages, the component extracting apparatus extracts a component supported by the component support stacked in the uppermost stage, and the component extracting apparatus further comprises a component support extraction control unit that causes the robot to face the uppermost component support in which the extraction of components is completed and to grasp and take out the component support from the uppermost stage.

16. The component extracting apparatus according to claim 11, wherein the measured object has a light spot group including three light spots and one light spot, the three light spots being disposed while spaced apart from one another, the one light spot being disposed while perpendicularly spaced apart from a triangular reference plane, the triangular reference plane having vertexes of the three light spots, and the image-taking control unit causes the camera to take an image of the light spot group on the measured object with the camera, the camera being placed in a position in which an imaging optical axis is not matched with a perpendicular to the reference plane, the perpendicular passing through the one light spot.

17. The component extracting apparatus according to claim 11, wherein the camera and the robot are fixed to each other, and the positions and the attitudes of the camera and robot are changed only integrally.

18. The component extracting apparatus according to claim 11, wherein the positions and attitudes of the camera and robot may be changed independently.

19. The component extracting apparatus according to claim 11, wherein the light spot is a light emitting diode.

20. The component extracting apparatus according to claim 11, wherein the light spot is a retroreflector that reflects incident light toward an incident direction.

21. A component assembling apparatus comprising:
  a camera;
  an image-taking control unit that causes the camera to take an image of a light spot group of a measured object, the measured object and a first component being supported in predetermined positions of an assembly pallet, the measured object having the light spot group including a plurality of light spots and serving as a measurement target of a position and an attitude;
  a position and attitude recognizing unit that recognizes the position and attitude of the measured object based on a light image expressing the light spots constituting the light spot group on the image taken with the camera;
  a position and attitude computing unit that computes a position and an attitude of the first component based on the position and attitude of the measured object and geometric arrangement positions of the measured object and the first component, the position and attitude of the measured object being recognized in the position and attitude recognizing unit, the measured object and the first component being supported by the assembly pallet;
  a robot that grasps a second component to assemble the second component in the first component; and
  a component assembly control unit that causes the robot to grasp the second component causes the second component to face the first component based on the position and attitude of the measured object recognized in the position and attitude recognizing unit, and causes the robot to assemble the second component in the first component.

22. The component assembling apparatus according to claim 21, wherein the measured object has a light spot group including three light spots and one light spot, the three light spots being disposed while spaced apart from one another, the one light spot being disposed while perpendicularly spaced apart from a triangular reference plane, the triangular reference plane having vertexes of the three light spots, and the image-taking control unit that causes the camera to take an image of the light spot group on the measured object, the camera being placed in a position in which an imaging optical axis is not matched with a perpendicular to the reference plane, the perpendicular passing through the one light spot.

23. The component assembling apparatus according to claim 21, wherein, in the component assembly control unit, a component group in which the second component has been assembled in the first component supported by the assembly pallet is set as a new first component, a component to be assembled in the new first component is set as a new second component, and component assembly is repeated a plurality of times.

24. The component assembling apparatus according to claim 23, wherein at least some components in a plurality of components to be sequentially assembled have light spots in positions in which a light spot appearance mode is changed according to an assembly stage of the plurality of components.

25. The component assembling apparatus according to claim 21, wherein the camera and the robot are fixed to each other, and the positions and attitudes of the camera and the robot are changed only integrally.

26. The component assembling apparatus according to claim 21, wherein the positions and attitudes of the camera and the robot may be changed independently.

27. The component assembling apparatus according to claim 21, wherein the light spot is a light emitting diode.

28. The component assembling apparatus according to claim 21, wherein the light spot is a retroreflector that reflects incident light toward an incident direction.

* * * * *